United States Patent
Will et al.

(10) Patent No.: US 12,231,467 B1
(45) Date of Patent: Feb. 18, 2025

(54) SYSTEM AND METHOD FOR DEPUTIZING SATELLITE ENDPOINTS

(71) Applicant: Tanium Inc., Kirkland, WA (US)

(72) Inventors: Stephen C. Will, Raleigh, NC (US); Casey J. Watson, Colorado Springs, CO (US); Bryan J. Blanchard, Frisco, TX (US); Ryan C. Catherman, Apex, NC (US); Yasmine Hal, Apex, NC (US); Clifford J. Mather, Chapel Hill, NC (US)

(73) Assignee: Tanium Inc., Emeryville, CA (US)

( * ) Notice: Subject to any disclaimer, the term of this patent is extended or adjusted under 35 U.S.C. 154(b) by 82 days.

(21) Appl. No.: 17/856,787

(22) Filed: Jul. 1, 2022

Related U.S. Application Data

(60) Provisional application No. 63/257,525, filed on Oct. 19, 2021.

(51) Int. Cl.
   *H04L 29/06* (2006.01)
   *H04B 7/185* (2006.01)
   (Continued)

(52) U.S. Cl.
   CPC ......... *H04L 63/20* (2013.01); *H04B 7/18513* (2013.01); *H04L 5/14* (2013.01); *H04L 63/0876* (2013.01); *H04L 63/1425* (2013.01)

(58) Field of Classification Search
   CPC ....... H04L 63/20; H04L 5/14; H04L 63/0876; H04L 63/1425; H04L 29/02;
   (Continued)

(56) References Cited

U.S. PATENT DOCUMENTS

| 5,220,596 A | 6/1993 | Patel |
| 5,842,202 A | 11/1998 | Kon |

(Continued)

FOREIGN PATENT DOCUMENTS

| EP | 1553747 A1 | 7/2005 |
| EP | 2493118 A1 | 8/2012 |

OTHER PUBLICATIONS

Abdalkarim Awad et al., "Virtual Cord Protocol (VCP): A Flexible DHT-like Routing Service for Sensor Networks", In Proceedings of the 5th IEEE International Conference on Mobile Ad Hoc and Sensor Systems, 2008, 10 pp. 133-142.

(Continued)

*Primary Examiner* — Joseph P Hirl
*Assistant Examiner* — Leynna Truvan
(74) *Attorney, Agent, or Firm* — Nicholson De Vos Webster & Elliott LLP

(57) ABSTRACT

A server system in communication with a plurality of machines that form a linear communication orbit establishes a direct duplex connection between the server system and a first endpoint machine. The server system enrolls the first endpoint machine as a satellite endpoint machine, which enables the satellite endpoint machine to execute one or more function modules. Typically, the server system authenticates, via the direct duplex connection, the first endpoint machine, and, after authenticating the first endpoint machine, sends, to the first endpoint machine, an instruction for executing a function module. The server system receives a report including information obtained by the first endpoint machine executing the function module. At least one of the establishing a direct duplex connection, sending the instruction, and receiving the report includes sending or receiving a communication between the first endpoint machine and the server system via the linear communication orbit.

28 Claims, 9 Drawing Sheets

(51) Int. Cl.
*H04L 5/14* (2006.01)
*H04L 9/40* (2022.01)

(58) Field of Classification Search
CPC ..... H04L 2012/5608; H04L 2012/6421; H04L 29/06326; H04L 29/06047; H04L 41/045; H04L 67/1091; H04B 7/18513; H04B 7/18528; H04B 7/18523; H04H 20/74; H04H 40/90; H04J 3/245; H04J 2203/0037; H04N 21/2665; H04N 21/25; H04N 21/6143; H04N 21/6193; H04N 2201/0039; H04N 2201/0044; H04W 84/06; G05B 2219/25172; G05B 2219/14124; G05B 2219/33151; G06F 3/1269; G06F 2209/541; G06F 2212/264; G07B 2017/00056; G07B 2017/00129; G08B 21/028
See application file for complete search history.

(56) References Cited

U.S. PATENT DOCUMENTS

| | | | |
|---|---|---|---|
| 5,949,755 A | 9/1999 | Uphadya et al. | |
| 6,049,828 A | 4/2000 | Dev et al. | |
| 6,226,493 B1 * | 5/2001 | Leopold | H04B 7/19 455/13.1 |
| 6,615,213 B1 | 9/2003 | Johnson | |
| 6,879,979 B2 | 4/2005 | Hindawi et al. | |
| 6,885,644 B1 | 4/2005 | Knop et al. | |
| 6,959,000 B1 | 10/2005 | Lee et al. | |
| 7,043,550 B2 | 5/2006 | Knop et al. | |
| 7,096,503 B1 | 8/2006 | Magdych | |
| 7,120,693 B2 | 10/2006 | Chang et al. | |
| 7,225,243 B1 | 5/2007 | Wilson | |
| 7,240,044 B2 | 7/2007 | Chaudhuri et al. | |
| 7,299,047 B2 | 11/2007 | Dolan et al. | |
| 7,483,430 B1 | 1/2009 | Yuan et al. | |
| 7,555,545 B2 | 6/2009 | McCasland | |
| 7,600,018 B2 | 10/2009 | Maekawa et al. | |
| 7,698,453 B2 | 4/2010 | Samuels et al. | |
| 7,720,641 B2 | 5/2010 | Alagappan et al. | |
| 7,761,557 B2 | 7/2010 | Fellenstein et al. | |
| 7,769,848 B2 | 8/2010 | Choy et al. | |
| 7,844,687 B1 | 11/2010 | Gelvin et al. | |
| 8,078,668 B2 | 12/2011 | Moreau | |
| 8,086,729 B1 | 12/2011 | Hindawi et al. | |
| 8,139,508 B1 | 3/2012 | Roskind | |
| 8,185,612 B1 | 5/2012 | Arolovitch et al. | |
| 8,185,615 B1 | 5/2012 | McDysan et al. | |
| 8,271,522 B2 | 9/2012 | Mehul et al. | |
| 8,392,530 B1 | 3/2013 | Manapragada et al. | |
| 8,477,660 B2 | 7/2013 | Lee et al. | |
| 8,504,879 B2 | 8/2013 | Poletto et al. | |
| 8,510,562 B2 | 8/2013 | Ramakrishnan et al. | |
| 8,650,160 B1 | 2/2014 | Beatty et al. | |
| 8,677,448 B1 | 3/2014 | Kauffman et al. | |
| 8,813,228 B2 | 8/2014 | Magee et al. | |
| 8,819,769 B1 | 8/2014 | Van Dijk | |
| 8,885,521 B2 | 11/2014 | Wang et al. | |
| 8,903,973 B1 | 12/2014 | Hindawi et al. | |
| 8,904,039 B1 | 12/2014 | Hindawi et al. | |
| 8,972,566 B1 | 3/2015 | Hindawi et al. | |
| 9,009,827 B1 | 4/2015 | Albertson et al. | |
| 9,059,961 B2 | 6/2015 | Hindawi et al. | |
| 9,104,794 B2 | 8/2015 | Zakonov et al. | |
| 9,246,977 B2 | 1/2016 | Hindawi et al. | |
| 9,576,131 B2 | 2/2017 | Tuvell et al. | |
| 9,609,007 B1 | 3/2017 | Rivlin et al. | |
| 9,667,738 B2 | 5/2017 | Hindawi et al. | |
| 9,716,649 B2 | 7/2017 | Bent et al. | |
| 9,729,429 B2 | 8/2017 | Hindawi et al. | |
| 9,769,037 B2 | 9/2017 | Hindawi et al. | |
| 9,769,275 B2 | 9/2017 | Hindawi et al. | |
| 9,800,603 B1 | 10/2017 | Sidagni et al. | |
| 9,910,752 B2 | 3/2018 | Lippincott et al. | |
| 9,973,525 B1 | 5/2018 | Roturier et al. | |
| 9,985,982 B1 | 5/2018 | Bartos et al. | |
| 9,998,955 B1 | 6/2018 | MacCarthaigh | |
| 10,015,185 B1 | 7/2018 | Kolman et al. | |
| 10,095,864 B2 | 10/2018 | Hunt et al. | |
| 10,111,208 B2 | 10/2018 | Hindawi et al. | |
| 10,136,415 B2 | 11/2018 | Hindawi et al. | |
| 10,148,536 B2 | 12/2018 | Hindawi et al. | |
| 10,261,770 B2 | 4/2019 | Devagupthapu et al. | |
| 10,372,904 B2 | 8/2019 | Hunt et al. | |
| 10,412,188 B2 | 9/2019 | Hindawi et al. | |
| 10,482,242 B2 | 11/2019 | Hunt et al. | |
| 10,484,429 B1 | 11/2019 | Fawcett | |
| 10,498,744 B2 | 12/2019 | Hunt et al. | |
| 10,649,870 B1 | 5/2020 | Lippincott et al. | |
| 10,674,486 B2 | 6/2020 | Hindawi et al. | |
| 10,708,116 B2 | 7/2020 | Hindawi et al. | |
| 10,795,906 B1 | 10/2020 | Teubner | |
| 10,824,729 B2 | 11/2020 | Hoscheit et al. | |
| 10,841,365 B2 | 11/2020 | White et al. | |
| 10,873,645 B2 | 12/2020 | Freilich et al. | |
| 10,929,345 B2 | 2/2021 | Stoddard et al. | |
| 11,032,298 B1 | 6/2021 | Robbins et al. | |
| 11,100,199 B2 | 8/2021 | Subramaniam | |
| 11,151,246 B2 | 10/2021 | Davis et al. | |
| 11,153,383 B2 | 10/2021 | Richards et al. | |
| 11,172,470 B1 | 11/2021 | Guieu et al. | |
| 11,258,654 B1 | 2/2022 | Hindawi et al. | |
| 11,277,489 B2 | 3/2022 | Freilich et al. | |
| 11,301,568 B1 | 4/2022 | Dargude et al. | |
| 11,343,355 B1 | 5/2022 | Goela et al. | |
| 11,372,938 B1 | 6/2022 | Stoddard et al. | |
| 11,461,208 B1 | 10/2022 | Lippincott et al. | |
| 11,563,764 B1 | 1/2023 | Hoscheit et al. | |
| 11,609,835 B1 | 3/2023 | Varga et al. | |
| 11,700,303 B1 | 7/2023 | Richards et al. | |
| 11,711,810 B1 | 7/2023 | Guieu et al. | |
| 11,777,981 B1 | 10/2023 | Hoscheit et al. | |
| 11,809,294 B1 | 11/2023 | Lippincott et al. | |
| 11,831,670 B1 | 11/2023 | Molls et al. | |
| 11,886,229 B1 | 1/2024 | Goela et al. | |
| 11,914,495 B1 | 2/2024 | Varga et al. | |
| 11,956,335 B1 | 4/2024 | Goela et al. | |
| 12,071,262 B2 * | 8/2024 | Turner | B64G 1/6464 |
| 2001/0056461 A1 | 12/2001 | Kampe et al. | |
| 2002/0007404 A1 | 1/2002 | Vange et al. | |
| 2002/0042693 A1 | 4/2002 | Kampe et al. | |
| 2002/0073086 A1 | 6/2002 | Thompson et al. | |
| 2002/0099952 A1 | 7/2002 | Lambert et al. | |
| 2002/0198867 A1 | 12/2002 | Lohman et al. | |
| 2003/0101253 A1 | 5/2003 | Saito et al. | |
| 2003/0120603 A1 | 6/2003 | Kojima et al. | |
| 2003/0131044 A1 | 7/2003 | Nagendra et al. | |
| 2003/0212676 A1 | 11/2003 | Bruce et al. | |
| 2003/0212821 A1 | 11/2003 | Gillies et al. | |
| 2004/0037374 A1 | 2/2004 | Gonikberg | |
| 2004/0044727 A1 | 3/2004 | Abdelaziz | |
| 2004/0044790 A1 | 3/2004 | Loach | |
| 2004/0054723 A1 | 3/2004 | Dayal | |
| 2004/0054889 A1 | 3/2004 | Pitsos | |
| 2004/0064522 A1 | 4/2004 | Zhang | |
| 2004/0076164 A1 | 4/2004 | Vanderveen et al. | |
| 2004/0190085 A1 | 9/2004 | Silverbrook et al. | |
| 2005/0004907 A1 | 1/2005 | Bruno et al. | |
| 2005/0053000 A1 | 3/2005 | Oliver et al. | |
| 2005/0108356 A1 | 5/2005 | Rosu et al. | |
| 2005/0108389 A1 | 5/2005 | Kempin et al. | |
| 2005/0195755 A1 | 9/2005 | Senta et al. | |
| 2006/0039371 A1 | 2/2006 | Castro et al. | |
| 2006/0128406 A1 | 6/2006 | Macartney | |
| 2006/0282505 A1 | 12/2006 | Hasha et al. | |
| 2007/0005738 A1 | 1/2007 | Alexion-Tiernan et al. | |
| 2007/0171844 A1 | 7/2007 | Loyd et al. | |
| 2007/0211651 A1 | 9/2007 | Ahmed et al. | |
| 2007/0230482 A1 | 10/2007 | Shim et al. | |
| 2007/0261051 A1 | 11/2007 | Porter et al. | |
| 2008/0082628 A1 | 4/2008 | Rowstron et al. | |
| 2008/0133582 A1 | 6/2008 | Andersch et al. | |

(56) References Cited

U.S. PATENT DOCUMENTS

| | | |
|---|---|---|
| 2008/0258880 A1 | 10/2008 | Smith et al. |
| 2008/0263031 A1 | 10/2008 | George et al. |
| 2008/0288646 A1 | 11/2008 | Hasha et al. |
| 2009/0125639 A1 | 5/2009 | Dam et al. |
| 2009/0271360 A1 | 10/2009 | Bestgen et al. |
| 2009/0285204 A1 | 11/2009 | Gallant et al. |
| 2009/0319503 A1 | 12/2009 | Mehul et al. |
| 2009/0328115 A1 | 12/2009 | Malik |
| 2010/0011060 A1 | 1/2010 | Hilterbrand et al. |
| 2010/0070570 A1 | 3/2010 | Lepeska |
| 2010/0085948 A1 | 4/2010 | Yu et al. |
| 2010/0094862 A1 | 4/2010 | Bent et al. |
| 2010/0154026 A1 | 6/2010 | Chatterjee et al. |
| 2010/0296416 A1 | 11/2010 | Lee et al. |
| 2010/0306252 A1 | 12/2010 | Jarvis et al. |
| 2011/0099562 A1 | 4/2011 | Nandy et al. |
| 2011/0231431 A1 | 9/2011 | Kamiwada et al. |
| 2011/0271319 A1 | 11/2011 | Venable, Sr. |
| 2011/0299455 A1 | 12/2011 | Ordentlich et al. |
| 2012/0053957 A1 | 3/2012 | Atkins |
| 2012/0110183 A1 | 5/2012 | Miranda et al. |
| 2012/0221692 A1 | 8/2012 | Steiner et al. |
| 2012/0269096 A1 | 10/2012 | Roskind |
| 2012/0330700 A1 | 12/2012 | Garg et al. |
| 2013/0110931 A1 | 5/2013 | Kim et al. |
| 2013/0170336 A1 | 7/2013 | Chen et al. |
| 2013/0212296 A1 | 8/2013 | Goel et al. |
| 2013/0276053 A1 | 10/2013 | Hugard, IV et al. |
| 2013/0326494 A1 | 12/2013 | Nunez et al. |
| 2014/0075505 A1 | 3/2014 | Subramanian |
| 2014/0101133 A1 | 4/2014 | Carston et al. |
| 2014/0149557 A1 | 5/2014 | Lohmar et al. |
| 2014/0164290 A1 | 6/2014 | Salter |
| 2014/0164552 A1 | 6/2014 | Kim et al. |
| 2014/0181247 A1 | 6/2014 | Hindawi et al. |
| 2014/0181295 A1 | 6/2014 | Hindawi et al. |
| 2014/0244727 A1 | 8/2014 | Kang et al. |
| 2014/0279044 A1 | 9/2014 | Summers |
| 2014/0280280 A1 | 9/2014 | Singh |
| 2014/0282586 A1 | 9/2014 | Shear |
| 2014/0372533 A1 | 12/2014 | Fu et al. |
| 2014/0375528 A1 | 12/2014 | Ling |
| 2015/0080039 A1 | 3/2015 | Ling et al. |
| 2015/0149624 A1 | 5/2015 | Hindawi et al. |
| 2015/0163121 A1 | 6/2015 | Mahaffey et al. |
| 2015/0172228 A1 | 6/2015 | Zalepa et al. |
| 2015/0199511 A1 | 7/2015 | Faile et al. |
| 2015/0199629 A1 | 7/2015 | Faile et al. |
| 2015/0256575 A1 | 9/2015 | Scott |
| 2015/0302458 A1 | 10/2015 | Dides |
| 2015/0312335 A1 | 10/2015 | Ying |
| 2015/0372911 A1 | 12/2015 | Yabusaki et al. |
| 2015/0373043 A1 | 12/2015 | Wang et al. |
| 2015/0378743 A1 | 12/2015 | Zellermayer et al. |
| 2016/0034692 A1 | 2/2016 | Singler |
| 2016/0080408 A1 | 3/2016 | Coleman et al. |
| 2016/0119251 A1 | 4/2016 | Solis et al. |
| 2016/0255142 A1 | 9/2016 | Hunt et al. |
| 2016/0255143 A1 | 9/2016 | Hunt et al. |
| 2016/0269434 A1 | 9/2016 | DiValentin et al. |
| 2016/0286540 A1 | 9/2016 | Hindawi et al. |
| 2016/0352588 A1 | 12/2016 | Subbarayan et al. |
| 2016/0360006 A1 | 12/2016 | Hopkins et al. |
| 2016/0378450 A1 | 12/2016 | Fu et al. |
| 2017/0093915 A1 | 3/2017 | Ellis et al. |
| 2017/0118074 A1 | 4/2017 | Feinstein et al. |
| 2017/0133843 A1 | 5/2017 | McNeill-McCallum et al. |
| 2017/0257432 A1 | 9/2017 | Fu et al. |
| 2017/0286690 A1 | 10/2017 | Chari |
| 2017/0346824 A1 | 11/2017 | Mahabir |
| 2018/0013768 A1 | 1/2018 | Hunt et al. |
| 2018/0039486 A1 | 2/2018 | Kulkarni et al. |
| 2018/0074483 A1 | 3/2018 | Cruz |
| 2018/0074796 A1 | 3/2018 | Alabes et al. |
| 2018/0191747 A1 | 7/2018 | Nachenberg et al. |
| 2018/0191766 A1 | 7/2018 | Holeman et al. |
| 2018/0267794 A1 | 9/2018 | Atchison et al. |
| 2018/0351792 A1 | 12/2018 | Hunter et al. |
| 2018/0351793 A1 | 12/2018 | Hunter et al. |
| 2018/0375892 A1 | 12/2018 | Ganor |
| 2019/0081981 A1 | 3/2019 | Bansal |
| 2019/0096217 A1 | 3/2019 | Pourmohammad et al. |
| 2019/0138512 A1 | 5/2019 | Pourmohammad et al. |
| 2019/0260638 A1 | 8/2019 | Yocam et al. |
| 2019/0280867 A1 | 9/2019 | Kurian |
| 2019/0319987 A1 | 10/2019 | Levy |
| 2019/0361843 A1 | 11/2019 | Stoddard et al. |
| 2020/0028890 A1 | 1/2020 | White et al. |
| 2020/0053072 A1 | 2/2020 | Glozman et al. |
| 2020/0195693 A1 | 6/2020 | Price |
| 2020/0198867 A1 | 6/2020 | Nakamichi |
| 2020/0202007 A1 | 6/2020 | Nagaraja et al. |
| 2020/0304536 A1 | 9/2020 | Mahabir |
| 2021/0027401 A1 | 1/2021 | Hovhannisyan et al. |
| 2021/0218711 A1 | 7/2021 | Biran et al. |
| 2022/0272084 A1* | 8/2022 | Hyatt .................. H04W 12/40 |
| 2023/0036694 A1 | 2/2023 | Coughlan |
| 2023/0058040 A1* | 2/2023 | Nevius .................. B64G 3/00 |
| 2023/0360040 A1* | 11/2023 | Childe .............. G06Q 20/0655 |

OTHER PUBLICATIONS

Hood, Proactive Network-Fault Detection, Sep. 1997, 9 pages.

Mongeau et al., "Ensuring integrity of network inventory and configuration data", Telecommunications Network Strategy and Planning Symposium, Networks 2004, 11th International Vienna, Austria, Jun. 13-16, 2004, 6 pgs.

Weixiong Rao et al., "Optimal Resource Placement in Structured Peer-to-Peer Networks," Jul. 2010, IEEE Transactions on Parallel and Distributed Systems, vol. 21, No. 7, 16 pgs.

Tanium Inc., International Search Report and Written Opinion, PCT/US2013/076971, Apr. 4, 2014, 19 pgs.

Tanium Inc., International Preliminary Report on Patentability, PCT/US2013/076971, Jun. 23, 2015, 14 pgs.

Tanium Inc., International Search Report and Written Opinion, PCT/US2014/067607, Feb. 18, 2015, 15 pgs.

Tanium Inc., International Preliminary Report on Patentability, PCT/US2014/067607, May 31, 2016, 11 pgs.

Tanium Inc., International Search Report and Written Opinion, PCT/US2015/020780, Jul. 2, 2015, 13 pgs.

Tanium Inc., International Preliminary Report on Patentability, PCT/US2015/020780, Sep. 27, 2016, 9 pgs.

Hindawi, Non-Final Office Action, U.S. Appl. No. 15/702,617, Jun. 1, 2018, 37 pgs.

Hindawi, Final Office Action, U.S. Appl. No. 15/702,617, Dec. 27, 2018, 54 pgs.

Hunt, Non-Final Office Action, U.S. Appl. No. 15/215,468, Oct. 4, 2018, 13 pgs.

Hunt, Notice of Allowance, U.S. Appl. No. 15/215,468, Jan. 24, 2019, 8 pgs.

Hunt, Notice of Allowance, U.S. Appl. No. 15/215,468, Apr. 1, 2019, 8 pgs.

Hunt, Non-Final Office Action, U.S. Appl. No. 15/215,474, Sep. 10, 2018, 10 pgs.

Hunt, Final Office Action, U.S. Appl. No. 15/215,474, Apr. 1, 2019, 7 pgs.

Hunt, Notice of Allowance, U.S. Appl. No. 15/215,474, Jul. 11, 2019, 9 pgs.

Hunt, Notice of Allowance, U.S. Appl. No. 15/713,518, Apr. 10, 2019, 14 pgs.

Lippincott, Notice of Allowance, U.S. Appl. No. 15/878,286, Apr. 25, 2019, 11 pgs.

Jae Woo Lee et al., "0 to 10k in 20 Seconds: Bootstrapping Large-Scale DHT Networks", 2011 IEE International Conference on Communications, Jun. 9, 2011, pp. 1-6.

Stoica et al., "Chord: A Scalable Peer-to-Peer Lookup Service for Internet Applications", 2001, pp. 1-12 (Year: 2002).

Ping Wang et al., "Peer-to-Peer Botnets: The Next Generation of Botnet Attacks", Jan. 2010, pp. 1-25 (Year: 2010).

(56) References Cited

OTHER PUBLICATIONS

Sean Rhea et al., "Handling Churn in a DHT", 2004, pp. 1-14 (Year: 2004).
Richards, Non-Final Office Action, U.S. Appl. No. 16/443,720, Sep. 4, 2020, 13 pgs.
Richards, Notice of Allowance, U.S. Appl. No. 16/443,720, Feb. 9, 2021, 8 pgs.
Richards, Notice of Allowance, U.S. Appl. No. 16/443,720, Jun. 15, 2021, 7 pgs.
Goela, Non-Final Office Action, U.S. Appl. No. 16/943,291, Jul. 16, 2021, 19 pgs.
Freilich, Non-Final Office Action, U.S. Appl. No. 17/129,638, Jul. 23, 2021, 7 pgs.
Goela, Notice of Allowance, U.S. Appl. No. 16/943,291, Oct. 1, 2021, 11 pgs.
Hindawi, Non-Final Office Action, U.S. Appl. No. 16/917,800, Jul. 1, 2021, 7 pgs.
Hindawi, Notice of Allowance, U.S. Appl. No. 16/917,800, Oct. 15, 2021, 7 pgs.
Goela, Notice of Allowance, U.S. Appl. No. 16/943,291, Oct. 18, 2021, 5 pgs.
Hoscheit, Non-Final Office Action, U.S. Appl. No. 17/001,586, Jun. 9, 2022, 7 pgs.
Freilich, Notice of Allowance, U.S. Appl. No. 17/129,638, Nov. 4, 2021, 9 pgs.
Stoddard, Non-Final Office Action, U.S. Appl. No. 16/870,742, Oct. 28, 2021, 7 pgs.
Stoddard, Notice of Allowance, U.S. Appl. No. 16/870,742, Mar. 7, 2022, 10 pgs.
Goela, Notice of Allowance, U.S. Appl. No. 16/943,291, Jan. 27, 2022, 12 pgs.
Lippincott, Notice of Allowance, U.S. Appl. No. 15/878,286, Jul. 31, 2019, 5 pgs.
Lippincott, Notice of Allowance, U.S. Appl. No. 15/136,790, Nov. 20, 2017, 9 pgs.
Lippincott, Notice of Allowance, U.S. Appl. No. 15/930,342, May 25, 2022, 9 pgs.
Guieu, Non-Final Office Action, U.S. Appl. No. 17/521,686, Oct. 4, 2022, 38 pages.
Guieu, Notice of Allowance, U.S. Appl. No. 16/854,844, Jul. 6, 2021, 16 pages.
Hindawi, Non-Office Action, U.S. Appl. No. 13/797,946, Feb. 27, 2015, 18 pgs.
Hindawi, Notice of Allowance, U.S. Appl. No. 13/797,946, Sep. 11, 2015, 18 pages.
Hindawi, Notice of Allowance, U.S. Appl. No. 15/004,757, Jul. 16, 2018, 7 pages.
Hindawi, Notice of Allowance, U.S. Appl. No. 16/194,240, Mar. 31, 2020, 6 pages.
Stoddard, Notice of Allowance, U.S. Appl. No. 16/532,391, Oct. 21, 2020, 10 pages.
Freilich, Notice of Allowance, U.S. Appl. No. 16/565,247, Oct. 15, 2020, 10 pages.
Freilich, Notice of Allowance, U.S. Appl. No. 17/503,023, Feb. 24, 2023, 8 pages.
Guieu et al., Notice of Allowance, U.S. Appl. No. 17/521,686, Mar. 3, 2023, 8 pages.
Lippincott et al., Notice of Allowance, U.S. Appl. No. 17/959,177, Mar. 28, 2023, 9 pages.
Lippincott et al., Notice of Allowance, U.S. Appl. No. 17/959,177, Jun. 21, 2023, 9 pages.
Daniel Varga et al., Non-Final Office Action, U.S. Appl. No. 18/123,930, Jun. 14, 2023, 7 pgs.
Naveen Goela et al., Non-Final Office Action, U.S. Appl. No. 17/182,083, Apr. 27, 2023, 7 pgs.
Naveen Goela et al., Notice of Allowance, U.S. Appl. No. 17/182,083, Sep. 20, 2023, 8 pgs.
Corrected Notice of Allowability, U.S. Appl. No. 17/683,213, Oct. 7, 2024, 2 pages.
Corrected Notice of Allowability, U.S. Appl. No. 17/683,213, Sep. 26, 2024, 2 pages.
Non-Final Office Action, U.S. Appl. No. 18/196,980, Sep. 19, 2024, 24 pages.
Non-Final Office Action, U.S. Appl. No. 18/374,621, Aug. 16, 2024, 9 pages.
Non-Final Office Action, U.S. Appl. No. 18/440,922, Sep. 5, 2024, 14 pages.
Non-Final Office Action, U.S. Appl. No. 18/516,882, Aug. 28, 2024, 11 pages.
Notice of Allowance, U.S. Appl. No. 17/683,213, Sep. 16, 2024, 18 pages.
Notice of Allowance, U.S. Appl. No. 18/225,620, Jul. 18, 2024, 7 pages.
Supplemental Notice of Allowability, U.S. Appl. No. 18/204,351, Oct. 1, 2024, 2 pages.
"Total Carbon Accounting: A Framework to Deliver Locational Carbon Intensity Data", White Paper, Nov. 2021, 29 pages.
Corrected Notice of Allowability, U.S. Appl. No. 15/004,757, Aug. 24, 2018, 4 pages.
Corrected Notice of Allowability, U.S. Appl. No. 15/174,850, Jul. 25, 2018, 37 pages.
Corrected Notice of Allowability, U.S. Appl. No. 16/430,336, Oct. 15, 2020, 2 pages.
Corrected Notice of Allowability, U.S. Appl. No. 16/917,800, Dec. 16, 2021, 2 pages.
Corrected Notice of Allowability, U.S. Appl. No. 16/917,800, Nov. 18, 2021, 2 pages.
Corrected Notice of Allowability, U.S. Appl. No. 16/917,800, Oct. 25, 2021, 2 pages.
Corrected Notice of Allowability, U.S. Appl. No. 16/943,291, Apr. 11, 2022, 2 pages.
Corrected Notice of Allowability, U.S. Appl. No. 16/943,291, Feb. 25, 2022, 2 pages.
Corrected Notice of Allowability, U.S. Appl. No. 18/099,854, Jun. 5, 2023, 7 pages.
Final Office Action, U.S. Appl. No. 13/084,923, Jul. 1, 2013, 10 pages.
Final Office Action, U.S. Appl. No. 15/004,757, Dec. 29, 2017, 27 pages.
Final Office Action, U.S. Appl. No. 15/668,665, Dec. 10, 2019, 13 pages.
Final Office Action, U.S. Appl. No. 16/952,009, Dec. 13, 2022, 9 pages.
Final Office Action, U.S. Appl. No. 18/196,980, Mar. 11, 2024, 22 pages.
H. Brendan McMahan et al., "Communication-Efficient Learning of Deep Networks from Decentralized Data," 2017, 10 pages, Proceedings of the 20th International Conference on Artificial Intelligence and Statistics (AISTATS), Fort Lauderdale, Florida, USA.
Ian Goodfellow et al., "Deep Learning," 2016, 798 pages, MIT Press.
IT Services, "Environmental impact of IT: desktops, laptops and screens", How we are reducing IT waste, and steps you can take to reduce your carbon footprint, available online at <https://www.it.ox.ac.uk/article/environment-and-it>, Apr. 13, 2022, 5 pages.
Justin Sutton-Parker, "Can analytics software measure end user computing electricity consumption?", Springer, May 5, 2022, 19 pages.
Justin Sutton-Parker, "Determining commuting greenhouse gas emissions abatement achieved by information technology enabled remote working", The 11th International Conference on Sustainable Energy Information Technology (SEIT), Aug. 9-12, 2021, 9 pages.
Justin Sutton-Parker, Determining end user computing device Scope 2 GHG emissions with accurate use phase energy consumption measurement, The 10th International Conference on Sustainable Energy Information Technology (SEIT), Aug. 9-12, 2020, pp. 484-491.
Justin Sutton-Parker, "Quantifying greenhouse gas abatement delivered by alternative computer operating system displacement strategies", The 12th International Conference on Sustainable Energy Information Technology, Aug. 9-11, 2022, pp. 1-10.

(56) References Cited

OTHER PUBLICATIONS

Non-Final Office Action, U.S. Appl. No. 12/412,623, Mar. 7, 2011, 10 pages.
Non-Final Office Action, U.S. Appl. No. 13/084,923, Dec. 9, 2013, 13 pages.
Non-Final Office Action, U.S. Appl. No. 13/084,923, Feb. 14, 2013, 8 pages.
Non-Final Office Action, U.S. Appl. No. 13/107,625, Jan. 14, 2014, 9 pages.
Non-Final Office Action, U.S. Appl. No. 13/301,250, Jun. 26, 2013, 11 pages.
Non-Final Office Action, U.S. Appl. No. 14/530,601, Nov. 10, 2016, 8 pages.
Non-Final Office Action, U.S. Appl. No. 14/553,769, Feb. 9, 2017, 16 pages.
Non-Final Office Action, U.S. Appl. No. 14/554,711, Jul. 29, 2016, 23 pages.
Non-Final Office Action, U.S. Appl. No. 14/554,739, Aug. 26, 2016, 30 pages.
Non-Final Office Action, U.S. Appl. No. 15/004,757, Jun. 21, 2017, 23 pages.
Non-Final Office Action, U.S. Appl. No. 15/004,757, Mar. 9, 2018, 57 pages.
Non-Final Office Action, U.S. Appl. No. 15/668,665, Aug. 7, 2019, 11 pages.
Non-Final Office Action, U.S. Appl. No. 16/943,307, Apr. 27, 2022, 7 pages.
Non-Final Office Action, U.S. Appl. No. 16/952,009, Aug. 1, 2022, 8 pages.
Non-Final Office Action, U.S. Appl. No. 17/503,023, Nov. 25, 2022, 7 pages.
Non-Final Office Action, U.S. Appl. No. 17/732,402, May 21, 2024, 20 pages.
Non-Final Office Action, U.S. Appl. No. 17/751,504, Jun. 9, 2023, 31 pages.
Non-Final Office Action, U.S. Appl. No. 18/196,980, Sep. 8, 2023, 17 pages.
Non-Final Office Action, U.S. Appl. No. 18/204,351, Jan. 5, 2024, 8 pages.
Non-Final Office Action, U.S. Appl. No. 18/225,620, Mar. 14, 2024, 14 pages.
Notice of Allowability, U.S. Appl. No. 17/751,504, Dec. 18, 2023, 11 pages.
Notice of Allowance, U.S. Appl. No. 12/412,623, Oct. 5, 2011, 5 pages.
Notice of Allowance, U.S. Appl. No. 13/084,923, Jul. 30, 2014, 7 pages.
Notice of Allowance, U.S. Appl. No. 13/107,625, Apr. 23, 2014, 7 pages.
Notice of Allowance, U.S. Appl. No. 13/107,625, Oct. 22, 2014, 7 pages.
Notice of Allowance, U.S. Appl. No. 13/301,250, Jan. 21, 2014, 10 pages.
Notice of Allowance, U.S. Appl. No. 13/301,250, Oct. 24, 2014, 8 pages.
Notice of Allowance, U.S. Appl. No. 13/797,962, Feb. 17, 2015, 10 pages.
Notice of Allowance, U.S. Appl. No. 14/530,601, Apr. 5, 2017, 8 pages.
Notice of Allowance, U.S. Appl. No. 14/553,769, May 19, 2017, 6 pages.
Notice of Allowance, U.S. Appl. No. 14/554,711, Jan. 27, 2017, 22 pages.
Notice of Allowance, U.S. Appl. No. 14/554,739, May 9, 2017, 20 pages.
Notice of Allowance, U.S. Appl. No. 15/174,850, Jun. 20, 2018, 39 pages.
Notice of Allowance, U.S. Appl. No. 15/215,483, Jun. 7, 2018, 9 pages.
Notice of Allowance, U.S. Appl. No. 15/668,665, Mar. 2, 2020, 7 pages.
Notice of Allowance, U.S. Appl. No. 15/686,054, Jul. 18, 2018, 6 pages.
Notice of Allowance, U.S. Appl. No. 15/702,617, Apr. 23, 2019, 24 pages.
Notice of Allowance, U.S. Appl. No. 15/713,518, Jul. 29, 2019, 13 pages.
Notice of Allowance, U.S. Appl. No. 15/878,286, Jan. 10, 2020, 6 pages.
Notice of Allowance, U.S. Appl. No. 15/930,342, Mar. 24, 2022, 8 pages.
Notice of Allowance, U.S. Appl. No. 16/033,131, Jun. 30, 2020, 27 pages.
Notice of Allowance, U.S. Appl. No. 16/194,240, Aug. 14, 2019, 10 pages.
Notice of Allowance, U.S. Appl. No. 16/194,240, Mar. 2, 2020, 9 pages.
Notice of Allowance, U.S. Appl. No. 16/194,240, Nov. 7, 2019, 10 pages.
Notice of Allowance, U.S. Appl. No. 16/430,336, Aug. 7, 2020, 28 pages.
Notice of Allowance, U.S. Appl. No. 16/430,336, Sep. 3, 2020, 5 pages.
Notice of Allowance, U.S. Appl. No. 16/565,247, Aug. 17, 2020, 19 pages.
Notice of Allowance, U.S. Appl. No. 16/943,307, Nov. 8, 2022, 11 pages.
Notice of Allowance, U.S. Appl. No. 16/943,307, Oct. 6, 2022, 12 pages.
Notice of Allowance, U.S. Appl. No. 16/952,009, Jul. 25, 2023, 8 pages.
Notice of Allowance, U.S. Appl. No. 16/952,009, Mar. 28, 2023, 8 pages.
Notice of Allowance, U.S. Appl. No. 17/001,586, Sep. 8, 2022, 8 pages.
Notice of Allowance, U.S. Appl. No. 17/751,504, Nov. 21, 2023, 12 pages.
Notice of Allowance, U.S. Appl. No. 18/099,854, May 26, 2023, 12 pages.
Notice of Allowance, U.S. Appl. No. 18/123,930, Nov. 7, 2023, 11 pages.
Notice of Allowance, U.S. Appl. No. 18/204,351, Jun. 21, 2024, 10 pages.
Peter Kairouz et al., "Advances and Open Problems in Federated Learning," 2021, 121 pages, arXIV:1912.04977v3.
Requirement for Restriction/Election, U.S. Appl. No. 12/412,623, Nov. 22, 2010, 5 pages.
Requirement for Restriction/Election, U.S. Appl. No. 13/107,625, Oct. 11, 2013, 6 pages.
Supplemental Notice of Allowability, U.S. Appl. No. 16/443,720, Aug. 4, 2021, 2 pages.
Supplemental Notice of Allowability, U.S. Appl. No. 16/870,742, Apr. 11, 2022, 2 pages.
Trevor Hastie et al., "The Elements of Statistical Learning, Data Mining, Inference, and Prediction," 2001, 545 pages, Springer.
Trevor Hastie et al., "The Elements of Statistical Learning, Data Mining, Inference, and Prediction," 2008, 764 pages, Second Edition, Springer.

* cited by examiner

400

---

402 Identify a first endpoint machine, of the plurality of machines, in a linear communication orbit.

404 Establish a direct duplex connection between the server system and the first endpoint machine.

406 Establishing the direct duplex connection comprises sending an instruction packet via the linear communication orbit, wherein:
  the instruction packet has been propagated to the first endpoint machine through one or more upstream machines along the linear communication orbit, and
  the instruction packet includes an instruction for establishing the direct duplex connection between the first endpoint machine and the server system.

408 The direct duplex connection is an encrypted channel such that credentials are not shared over a communication network that includes the linear communication orbit.

410 Enroll the first endpoint machine as a satellite endpoint machine, wherein enrolling the satellite endpoint machine enable the satellite endpoint machine to execute one or more function modules.

412 Enrolling the first endpoint machine includes matching a unique identifier, provided by the first endpoint machine via the direct duplex connection, to a unique identifier retrieved via another channel.

413 Authenticate, via the direct duplex connection, the first endpoint machine.

Figure 4A

432 At least one of the establishing a direct duplex connection, sending the instruction, and receiving the report includes sending or receiving a communication between the first endpoint machine and the server system via the linear communication orbit.

434 Identify a second endpoint machine as a satellite endpoint machine, wherein each of a plurality of endpoint machines identified as satellite endpoint machines is assigned a distinct subset of endpoint machines in a network from which to collect information and/or to which module services are to be provided.

Figure 4C

SYSTEM AND METHOD FOR DEPUTIZING SATELLITE ENDPOINTS

RELATED APPLICATIONS

This application claims priority to U.S. Provisional Patent Application Ser. No. 63/257,525, filed Oct. 19, 2021, which is hereby incorporated by reference in its entirety.

This application is related to U.S. application Ser. No. 15/215,474, filed Jul. 20, 2016, now U.S. Pat. No. 10,482,242, titled "System and Method for Performing Event Inquiries in a Network," which claims the benefit of U.S. Provisional Application Ser. No. 62/333,768, filed May 9, 2016, and U.S. Provisional Patent Application Ser. No. 62/305,482, filed Mar. 8, 2016, titled "Cost Prioritized Evaluations of Indicators of Compromise." The content of each of the above applications is hereby incorporated by reference in its entirety.

This application is also related to U.S. patent application Ser. No. 13/797,946, filed Mar. 12, 2013, now U.S. Pat. No. 9,246,977, titled "System and Network Management Using Self-Organizing Communication Orbits in Distributed Networks"; U.S. patent application Ser. No. 12/412,623, filed Mar. 27, 2009, now U.S. Pat. No. 8,086,729, titled "Distributed Statistical Detection of Network Problems and Causes"; U.S. patent application Ser. No. 13/084,923, filed Apr. 12, 2011, now U.S. Pat. No. 8,904,039, titled "Large-Scale Network Querying and Reporting"; U.S. patent application Ser. No. 13/107,625, filed May 13, 2011, now U.S. Pat. No. 8,903,973, titled "Parallel Distributed Network Management"; U.S. patent application Ser. No. 14/553,769, filed Nov. 25, 2014, now U.S. Pat. No. 9,769,037, titled "Fast Detection and Remediation of Unmanaged Assets"; U.S. patent application Ser. No. 14/554,739, filed Nov. 26, 2014, now U.S. Pat. No. 9,769,275, titled "Data Caching and Distribution in a Local Network"; and U.S. patent application Ser. No. 15/136,790, filed Apr. 22, 2016, now U.S. Pat. No. 9,910,752, titled "Reliable Map-Reduce Communications in a Decentralized, Self-Organizing Communication Orbit of a Distributed Network." Content of each of the above applications is hereby incorporated by reference in its entirety.

The above applications are also referred to hereafter as "the Related Applications" or "the Incorporated Disclosure."

TECHNICAL FIELD

The present disclosure relates to task management and decentralized performance in computers and computer networks.

BACKGROUND

In order to maintain a high level of security, devices, sometimes called client devices or endpoint devices, that are within secured networks (e.g., enterprise-level networks, such as banking networks, e-Commerce networks, etc.) are not provided with functional capabilities, in order to limit exposure of the network to outside threats. Instead, servers within the network are burdened with executing these functions, such as functions for identifying unmanaged devices within the network, performing security and risk management functions, and the like. There is a need to establish trust with a node such that the trusted node is enabled to perform some of these functions on behalf of a server system, without creating a threat to other machines within the network.

SUMMARY

Accordingly, there is a need to establish trusted connections between an endpoint machine (e.g., node) in a network and a server, that enables the server to control what functions the node can, and will, perform. To that end, a method is provided for distributed data processing. The method includes, at a server system, in communication with a plurality of machines that form a linear communication orbit, establishing a direct duplex connection between the server system and a first endpoint machine. The method further includes enrolling the first endpoint machine as a satellite endpoint machine, wherein enrolling the satellite endpoint machine enables it to execute one or more function modules. The method further includes, sending (e.g., after authenticating the first endpoint machine) to the first endpoint machine, an instruction for executing a function module at the first endpoint machine. The method includes receiving a report including information obtained by the first endpoint machine executing the function module. Typically, at least one of the operations of establishing the direct duplex connection, sending the instruction, and receiving the report includes sending or receiving a communication between the first endpoint machine and the server system via the linear communication orbit.

In some embodiments, the method includes authenticating the first endpoint machine via the direct duplex connection, and furthermore, the first endpoint machine is authenticated prior to sending the instruction for executing a function module.

In some embodiments, a computer system (e.g., node 102, administrator's device 116, server 108 and/or server 110, FIGS. 1A-1B, FIGS. 5-6) includes one or more processors and memory storing one or more programs for execution by the one or more processors, the one or more programs include instructions for performing, or controlling performance of, the operations of any of the methods described herein.

In some embodiments, a non-transitory computer readable storage medium stores one or more programs, the one or more programs comprising instructions, which, when executed by a computer system (e.g., node 102, administrator's device 116, server 108 and/or server 110, FIGS. 1A-1B, FIGS. 5-6) with one or more processors, cause the computer system to perform, or control performance of, the operations of any of the methods described herein.

In some embodiments, a computer system (e.g., node 102, administrator device 116, server 108 and/or server 110, FIGS. 1A-1B, FIGS. 5-6) includes means for performing, or controlling performance of, the operations of any of the methods described herein.

Other embodiments and advantages will be apparent to those skilled in the art in light of the descriptions and drawings in this specification.

BRIEF DESCRIPTION OF THE DRAWINGS

FIGS. 4A-4C illustrate a flow chart of a method for using satellite endpoints to execute function modules, in accordance with some embodiments.

Like reference numerals refer to corresponding parts throughout the drawings.

DESCRIPTION OF EMBODIMENTS

Some methods and devices described herein improve upon distributed data processing in a network by establishing a trusted client-initiated connection with a server which the client can then use to receive instructions to execute functions and send reports on said executed functions back to the server. In some embodiments, the client, after establishing trust, can be used by the server to perform event inquiries, via the client, on machines that are outside of the network without requiring the server to execute all of the tasks. Establishing trust with only specified clients on the network (e.g., clients determined to meet security criteria and processing power criteria), without providing all of the clients with the capability to perform these functions, improves the distribution of data processing while limiting the exposure of the network to security threats.

In some embodiments, the client is a respective node in a collection of nodes that forms a linear communication network as described herein and in the Incorporated Disclosure, which sets forth a network topology in which messages are passed from node to node in the linear communication orbit. To establish a trusted client-initiated connection, the remote server injects an instruction packet into the linear communication orbit, which travels from node to node through the upstream nodes of a respective node before reaching the respective node. The instruction packet includes instructions for establishing a direct duplex connection (e.g., a direct full-duplex connection, such as a WebSocket connection) with the server. The respective node establishes the direct duplex connection according to the instructions received through the linear communication orbit. Thereafter, the respective node can send secure messages (e.g., encrypted messages) and upload historical event data directly to the server (e.g., rather than by propagating messages from node to node through the linear communication orbit); and, the server can interact directly with the respective node in the network rather than through the linear communication orbit.

Figure 5:
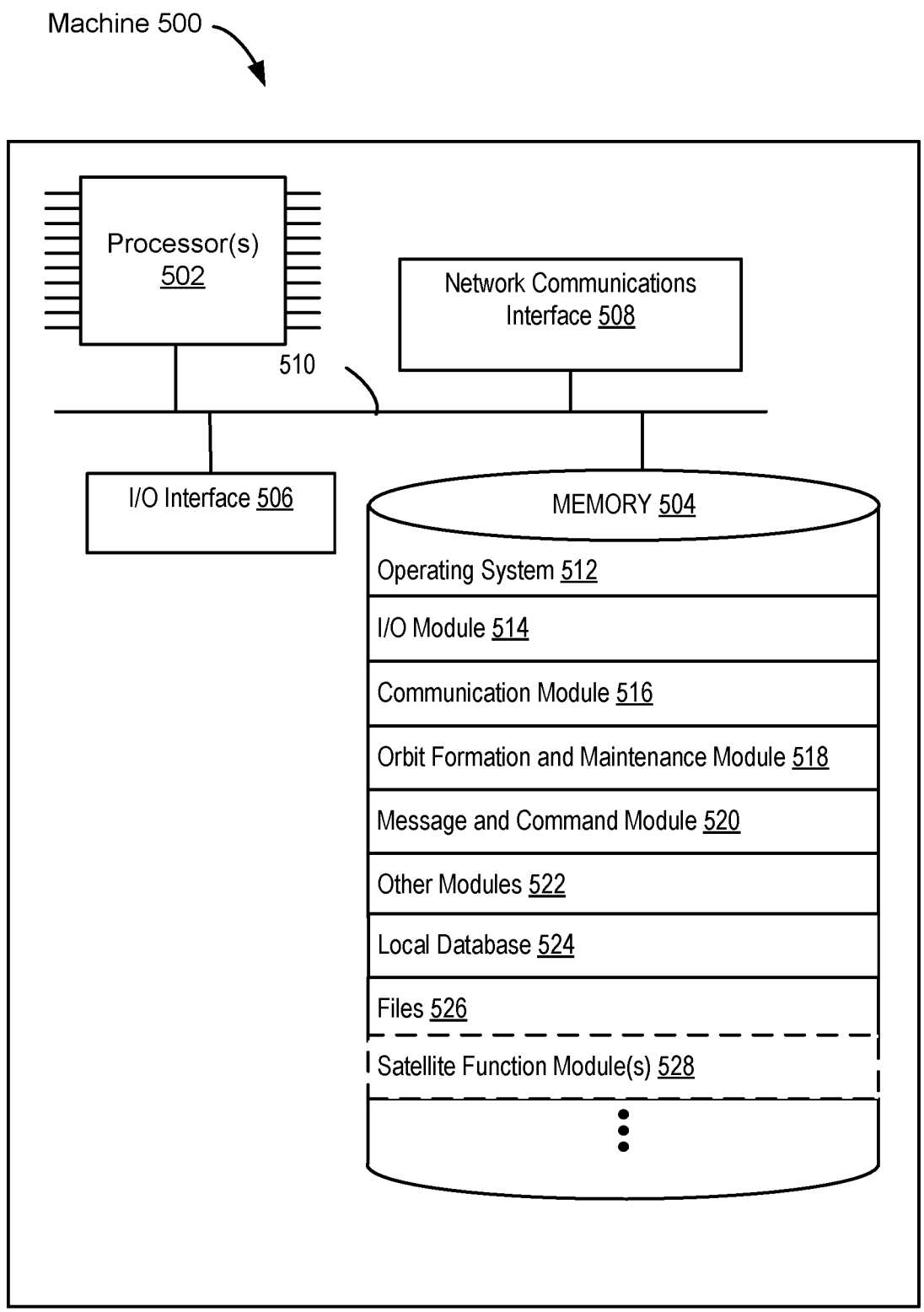
FIG. 5 is a block diagram of a system (e.g., an exemplary endpoint machine (e.g., node)) in accordance with some embodiments.
Figure 6:
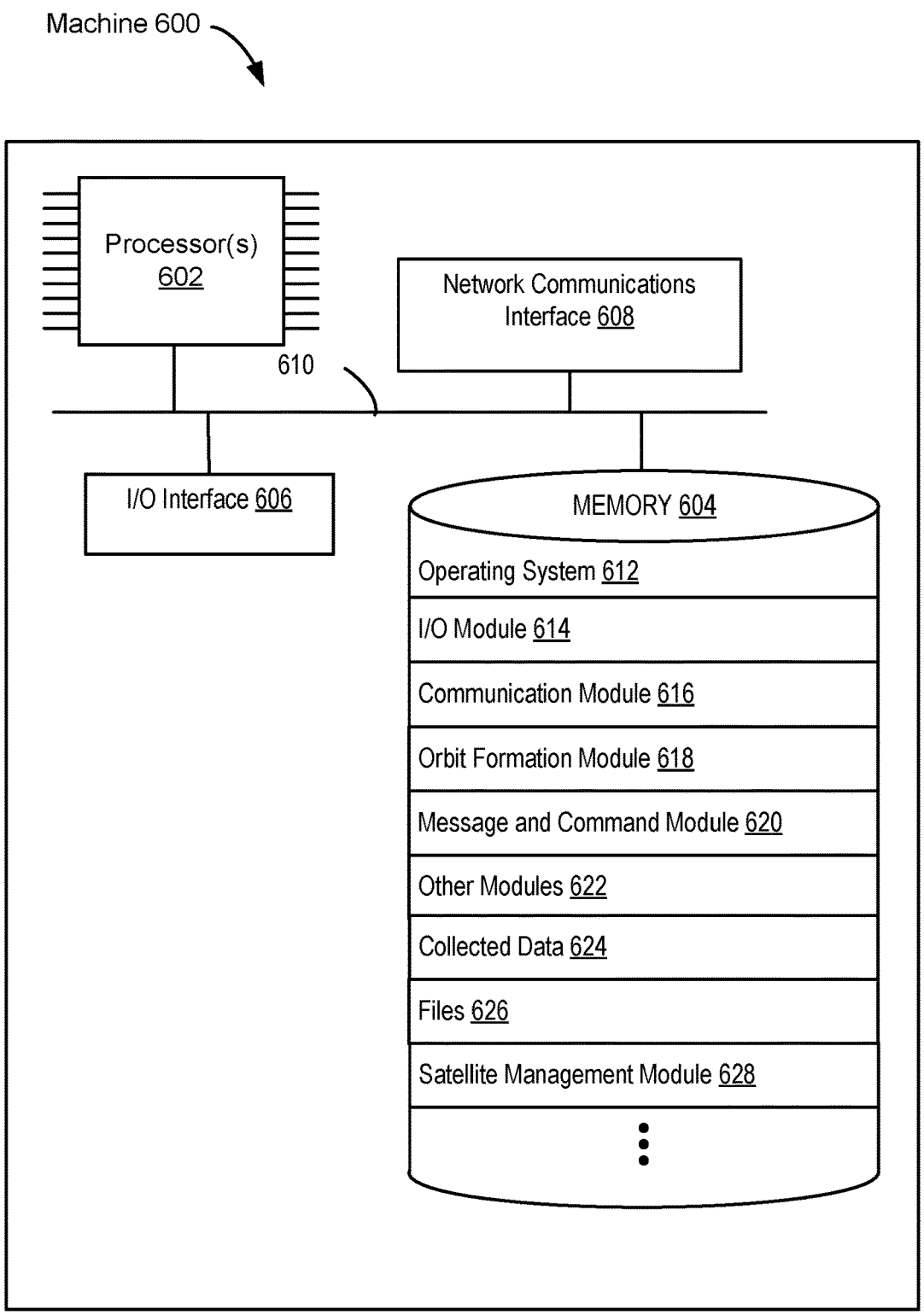
FIG. 6 is a block diagram of a system (e.g., a server of the network) in accordance with some embodiments.

Linear communication orbits are described below with reference to FIG. 1A. FIG. 1B illustrates a schematic diagram of a direct duplex connection between a node in a linear communication orbit and a remote server. FIG. 2 illustrates a schematic diagram of satellite machines executing functions on pluralities of machines. Methods for establishing satellite endpoint machines are described with reference to FIG. 3 and FIG. 4A-4C (method 400). FIGS. 5-6 are block diagrams of machines in a network or machines interacting with a network (e.g., a node and a server of a network).

Figure 1A:
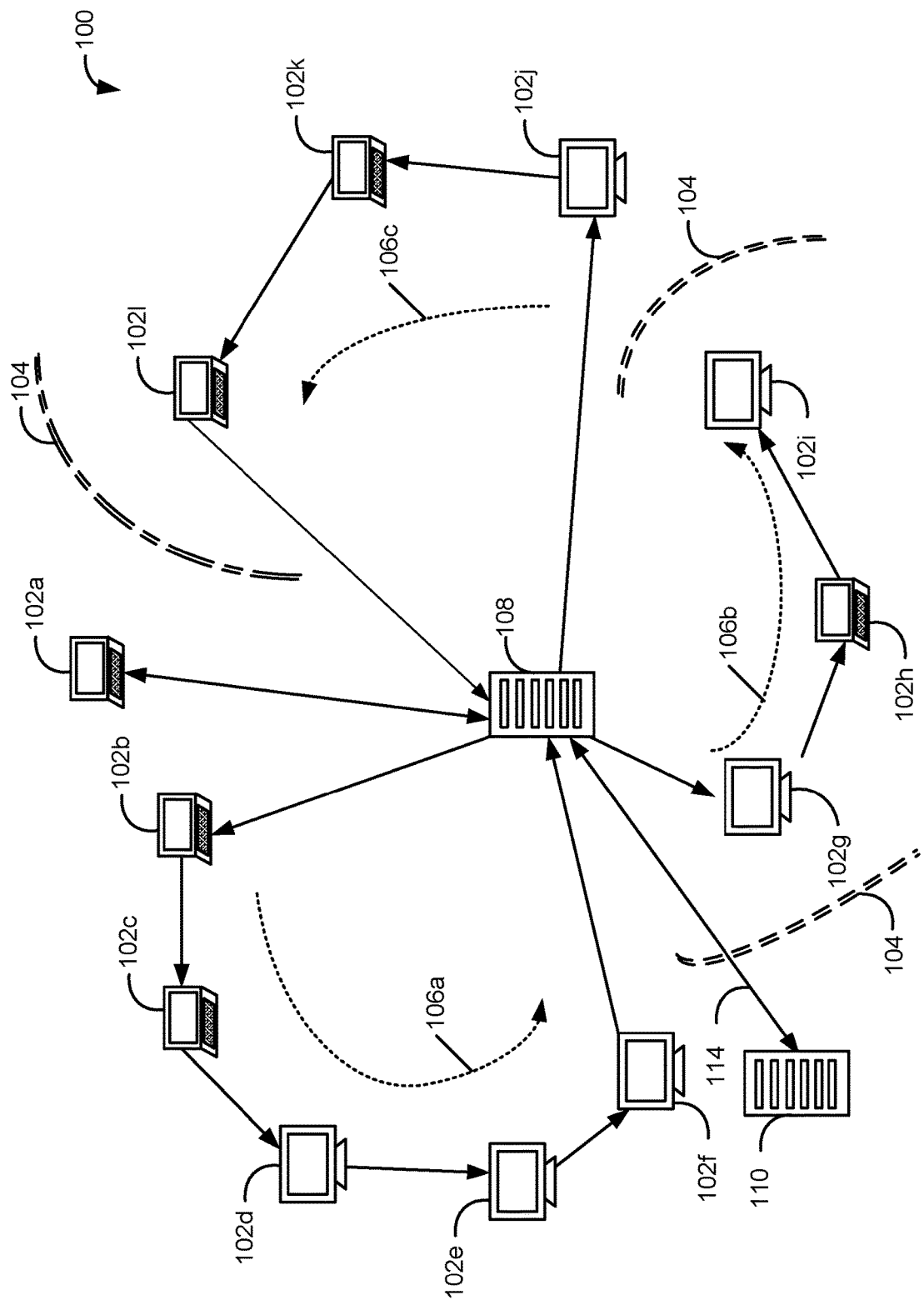
FIGS. 1A-1B illustrate a computer network organized into linear communication orbits, in accordance with some embodiments.
Figure 1B:
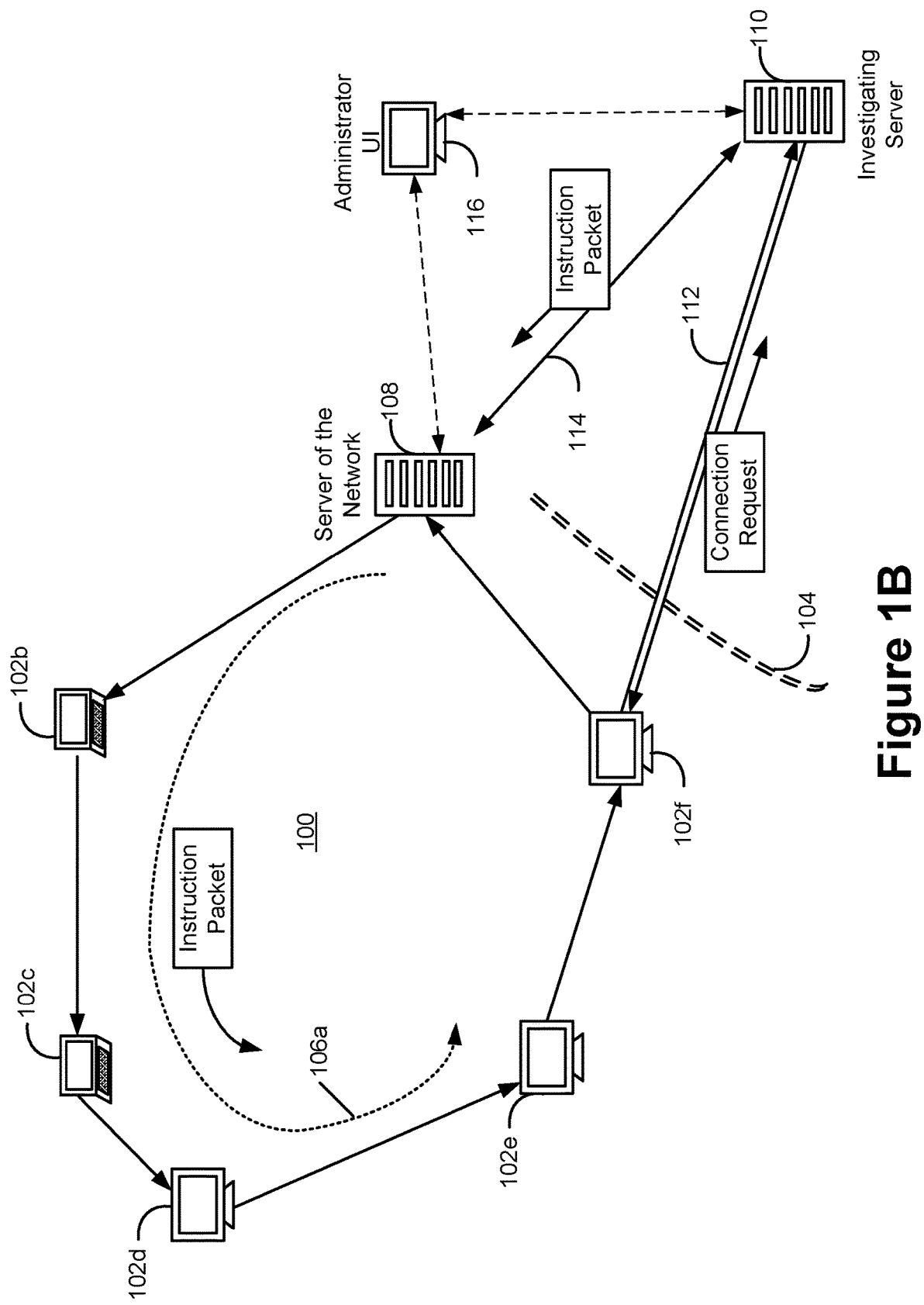
Figure 2:
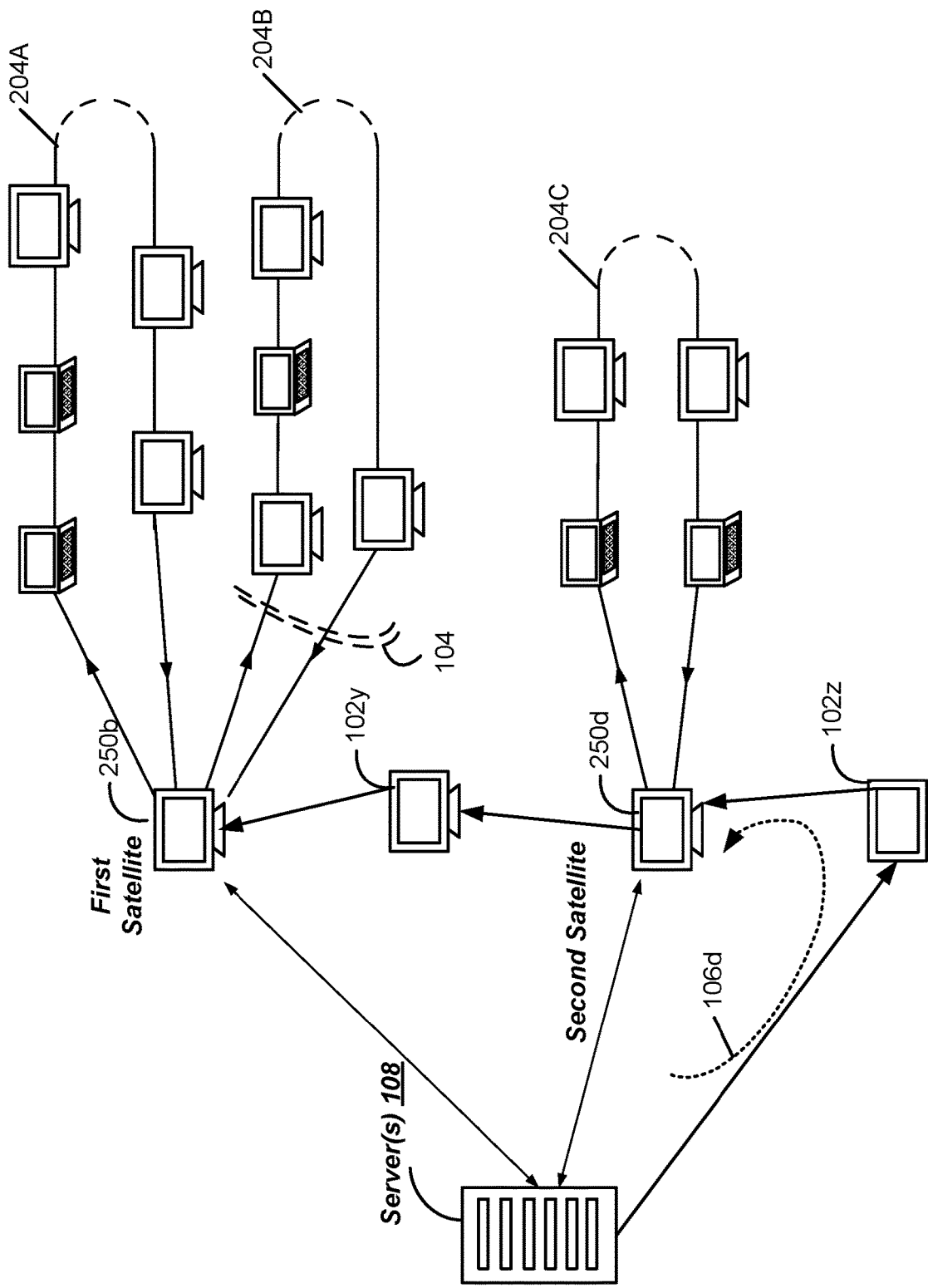
FIG. 2 illustrates examples of satellite endpoints in a linear communication orbit, in accordance with some embodiments.

FIG. 1A illustrates a computer network organized into linear communication orbits, in accordance with some embodiments. More specifically, FIG. 1A illustrates a managed network 100 comprising a plurality of interconnected machines or nodes 102 (including 102a), e.g., computers, servers, mobile devices, and other networked devices that are arranged into one or more linear communication orbits. In some embodiments, the network monitoring methods described herein are performed at one or more nodes (e.g., one or more of nodes 102, see FIGS. 1A and 1B) of a linear communication orbit. In some embodiments, the methods described herein are performed at a remote server (e.g., remote server 110) that is not part of network 100 and is optionally separated from network 100 by a firewall 104, see FIGS. 1A and 1B). In some embodiments, the methods described herein are performed at an administrator's device (e.g., administrator's device 116 that interacts with one or more nodes 102 through server 108 of the network and/or remote server 110, see FIG. 1B). The linear communication orbit structure shown in FIG. 1A is an alternative to the conventional hub-and-spoke or hierarchical architecture for managed networks. However, in some embodiments, the network monitoring methods described herein are performed at one or more nodes/servers of a hub-and-spoke network, where the remote server sends the instruction packet to a respective node through the server of the hub-and-spoke network or the top node of hierarchical architecture, and allow the respective node to initiate the outbound connection request to the remote server.

Examples of managed network 100 include enterprise networks or other networks under common management. In some embodiments, at least some of machines 102 coupled to managed network 100 are distributed across different geographical areas and/or localized at the same physical location. In some embodiments, machines 102 coupled to managed network 100 are divided into several sub-networks separated by one or more firewalls 104. In some embodiments, the network 100 is separated from external networks by one or more firewalls 104.

In some embodiments, machines 102 currently coupled to network 100 are self-organized into one or more contiguous segments 106 (e.g., 106a, 106b, etc.) of a single linear communication orbit. In some embodiments, each contiguous segment 106 constitutes a respective linear communication orbit.

In some embodiments, managed network 100 also includes server 108 that facilitates the creation and maintenance of the one or more contiguous segments 106. The server 108 may be relatively lightweight (e.g., uses less resources, has a lower memory footprint and/or has a lower CPU load as compared with a typical host server), and may be elected from machines 102 in the network.

In some embodiments, as shown in FIG. 1A, the linear communication orbit linking all of the machines coupled to network 100 includes a respective communication channel between each pair of adjacent machines in an ordered sequence of all machines 102 in network 100. In some embodiments, communication between a pair of adjacent machines 102 (e.g., machine 102g and machine 102f) across a firewall 104 may need to be bridged by an intermediate server (e.g., server 108).

An important feature of linear communication orbit(s) 106 is that, in some embodiments, they are automatically formed without global, continuous, and/or active intervention by any network administrative program or personnel. Each machine 102 joining network 100 is equipped with (or provided with) a set of predetermined rules. According to the set of predetermined rules, each machine 102 finds its immediate neighbor machines and coordinates with these immediate neighbor machines to self-organize into a local segment of the linear communication orbit. The local segments of adjacent machines overlap and fuse into a contiguous segment of the linear communication orbit. In some embodiments, the linear communication orbit grows or contracts as machines join and leave network 100 (e.g., the network is non-static), through the independent local actions of the machines in network 100, without global, continuous, and/or active intervention by any network administrative programs or personnel. Although all machines 102 implement the same set of rules, and each machine directly interacts only with its immediate neighbor machines to facilitate the formation of the orbit, the rules are designed in a way that cause the machines' independent local actions to be globally consistent and to result in self-organization and automatic repair and maintenance of linear communication orbit(s) 106.

In some embodiments, all machines 102 coupled to network 100 are sorted into an ordered sequence according to a respective unique identifier associated with each machine 102. These identifiers are also referred to as the addresses of the machines in the network. For example, in some embodiments, respective IP addresses of machines 102 are used as the identifiers to sort the machines into an ordered sequence. In some embodiments, the machines are sorted according to decreasing IP address values, an upstream direction of the linear communication orbit is the direction of increasing IP address values, and a downstream direction of the linear communication orbit is the direction of decreasing IP address values. In some embodiments, the machines are sorted according to increasing IP address values, an upstream direction of the linear communication orbit is the direction of decreasing IP address values, and a downstream direction of the linear communication orbit is the direction of increasing IP address values.

In some embodiments, other types of unique identifiers or addresses may be used. For each type of unique identifier or address, the set of predetermined rules provides a deterministic way of sorting the unique identifiers or addresses of that type into an ordered sequence. Given the identifiers or addresses of two machines in the network, the relative order of the two machines and their distances in the linear communication orbit (also referred to as an interval between the two machines) can be determined. In some embodiments, not all possible addresses are occupied by a corresponding machine in the network.

In some embodiments, each machine 102 receiving a communication message (e.g., a message including a question part, and an answer part) from its upstream neighbor node acts upon the message by providing an update to the message based on its local state or information, performing some aggregation of the information in the message (e.g., by adding to or modifying aggregated results already included in the message as received from its upstream neighbor), and/or forwarding the message to its downstream neighbor node along the linear communication orbit. Essentially, each machine expends a small amount of resources to take on a small part of the duties of data aggregation without being overly burdened. In the threat management scenario, in some embodiments, the query part of a message may include a request for evaluating an indicator item (e.g., "Is a file with a filename [VIRUS-NAME].EXE present?"), and the answer part may be a hit counter (e.g., a counter for "yes" answers) or log to which a node can append its unique identifier (ID) if the result of the evaluation is a hit (e.g., a "yes" or "TRUE" answer). In some embodiments, instructions for a remedial action (e.g., an executable script) and criteria for determining which node should execute the instructions for the remedial action (e.g., IDs or characteristics of the affected node(s)) may be included in a communication message and propagated along the linear communication orbit (see FIG. 1A) or through a direct duplex connection (see FIG. 1B). A node fitting the criteria will execute the remedial action when it receives the communication message. More details on how the system, security and network management messages are propagated to and collected from machines 102 in network 100 through linear communication orbit(s) 106 are provided in the Incorporated Disclosure.

In some embodiments, each node implements a set of common rules such that each node in the linear communication orbit knows what to do with respect to each query it receives or knows about, without requiring excessive back and forth interactive communications between the nodes themselves or between the nodes and the central management of a server or administrator. This set of common rules is different from the set of common rules for establishing and maintaining the linear communication orbit as described in the Incorporated Disclosure, and can be used in addition to the set of common rules for establishing and maintaining the linear communication orbit.

An advantage of message communication over the linear communication orbit is that queries, answers, and/or instructions regarding threat detection and management can be quickly passed to and from a node 102 or server 108 without excessive communication and computational overhead. In some embodiments, server 108 (or a remote server 110 in communication with server 108) generates individual queries based on IOC feeds or specifications received from various sources (e.g., third-party threat research firms, internal threat management personnel, etc.), where each query contains a request for evaluation of one or more indicator items at one or more targeted nodes (e.g., nodes that meet certain criteria specified in the query). In some embodiments, the server determines the order, frequency, and/or priority by which the queries should be injected. In some embodiments, the server sends out all of the queries and the criteria that individual nodes can use to locally prioritize the evaluation of the indicator items in the queries. The individual nodes perform local evaluation of the indicator items with the order and frequencies set in accordance with the criteria, and send the results back to server 108 through the linear communication orbit.

In some embodiments, server 108 sends the results (e.g., sends an aggregated response) to remote server 110. In some embodiments, server 108/110 determines whether a threat exists in the network and automatically sends out instructions for one or more remedial actions to be carried out at the affected node(s) (e.g., quarantining the affected nodes from the rest of the network, cleaning up offending files, collecting artifacts from the affected nodes, etc.). In some embodiments, remote server 110 communicates with server 108 via secure connection 114. In some embodiments, when remote server 110 needs to send a message or instruction packet to a particular node in the network and a direct connection between remote server 110 and the particular node does not already exist, remote server 110 optionally sends the message to server 108 and has server 108 forward the message or instruction packet to the particular node along the linear communication orbit. In some embodiments, remote server 110 starts a network-wide information gathering processes by sending a series of queries or one or more IOCs to server 108 (or a starting node of the linear communication orbit), allowing server 108 (or the starting node) to propagate the queries or IOCs into the network along the linear communication orbit, and receiving the answers or evaluation results (e.g., individual answers, aggregated answers, and/or metrics and statistics computed based on the answers or evaluation results collected from the nodes in the network) from server 108 (or an end node of the linear communication orbit).

The lightweight, decentralized mechanism (e.g., the set of common action rules observed by the nodes in the network) allows the nodes in the network to self-organize into one or more linear communication orbits, and allows the linear communication orbits to recover/self-heal from broken links and slow connections (e.g., by temporarily bypassing unresponsive nodes) without active administrative intervention. The self-organization and self-healing aspects of the linear communication orbits ensure that communication and data collection bottlenecks are quickly discovered and eliminated, without causing much observable impact on the communication and data collection speed. In addition, when collecting data along the linear communication orbits, the server may inject queries regarding different aspects of the nodes in separate messages, and the messages may be propagated down the linear communication orbit, processed in parallel at the nodes, and answered by as many nodes as possible (e.g., nodes that satisfy matching criteria specified by the messages), without being held up by any slow responding nodes. In fact, communication with and data collection from any and all nodes in the network (e.g., enterprise networks with thousands or millions of nodes) may be accomplished in substantially real-time (e.g., a matter of seconds), as opposed to taking days and weeks in a network with a conventional hierarchical or hub-and-spoke configuration. For example, messages are delivered to the nodes at the speed at which messages are propagated through the linear communication orbit, and the processing of the queries at the nodes occurs after receiving the messages, in parallel at the nodes. In some embodiments, answers to the queries are collected in a subsequent traversal of the linear communication orbit by either the original messages (propagating in the reverse direction) or by subsequent "answer collection" messages.

FIG. 1B illustrates that, in some embodiments, remote server 110 communicates (e.g., sends messages and/or queries) directly with a respective node (e.g., node 102*f*) over direct duplex connection 112 (e.g., a WebSocket connection). In some embodiments, remote server 110 is part of the linear communication orbit (e.g., on the same network as the machine 102*f*). For example, a direct duplex connection is established between server of the network 108 and one or more nodes within the linear communication orbit 106*a*. In some embodiments, remote server 110 is part of a server system that includes numerous servers that perform a variety of functions.

Various methods are provided herein for establishing direct duplex connections between remote server 110 and nodes 102 in a linear communication orbit, and for enrolling a node as a satellite endpoint machine (e.g., as described with reference to FIG. 3 and FIGS. 4A-4C). Direct duplex connection 112 is particularly useful when a server has deputized a respective node (e.g., as a satellite endpoint machine) in the network to carry out tasks that are typically performed by the server (e.g., and to carry out frequent back and forth interactions and/or to transfer large amounts of local event data and/or deploy a security patch). The messages and/or queries can be analogous to those described above, but they are sent directly to the respective node via direct duplex connection 112 (rather than being propagated through linear communication orbit 106*a*), and without the communication needing to be bridged by server 108. In some embodiments, remote server 110 can communicate with the respective node either through direct duplex connection 112 (e.g., when remote server 110 wants to query (e.g., receive reports from) only the respective node) or through linear communication orbit 106*a* (e.g., when remote server 110 wants an aggregated response to a query from some or all of the nodes 102 in the linear communication orbit 106*a*).

As described herein, the direct duplex connection between a particular node and remote server 110 is established with the particular node as the initiating party. In other words, from the perspective of the network, the connection is established with an outbound connection request sent from the node, rather than with an inbound connection request sent from the remote server. When the direct duplex connection is established with an outbound connection request sent from the node (e.g., the node sends the initial connection request in the connection establishment protocol (e.g., the handshake request in establishing a WebSocket connection)), there is no need to open the node's firewall, which would expose the node and network to outside security risks.

In some embodiments, in order to prompt a particular node to initiate the connection request for a direct duplex connection, remote server 110 sends a message or instruction packet to the particular node (e.g., node 102*f*) through a server of the network (e.g., server 108) and has the message or instruction packet propagated to the particular node through the linear communication orbit (e.g., linear communication orbit 106*a*). The message or instruction packet contains instructions and necessary data (e.g., public certificate for encryption, IP address, port #) for the particular node to establish the direct point-to-point persistent connection (e.g., a WebSocket connection) with the remote server. When the particular node receives the instruction packet from its upstream node, the particular node initiates the outbound connection request to the remote server. After the remote server receives the connection request from the particular node, the remote server and the node can proceed to establish the duplex connection according to the connection establishment protocol.

In some embodiments, the instruction packet can be dispatched to one or more particular nodes at the command of a network administrator or security incident responder. For example, the network administrator uses an administrator's device 116 to connect to remote server 110 (e.g., via a web interface or a client application provided by a service provider associated with the remote server 110) and manually selects the particular nodes using a network monitoring user interface. In some embodiments, the network monitoring user interface provides other functions, such as reviewing and modifying IOCs, queries, event artifacts, metrics and statistics for IOC evaluations and query responses, and performing sandbox investigation, etc.

In some embodiments, an event recorder is deployed on each node in the network that continuously records local values for particular indicator items (e.g., commonly used indicator items, such as filenames of newly created/modified/deleted/executed files, IP addresses of network connections, ports accessed, and processes started/killed, etc.) to a local event database. An administrator can query these local event databases from the network monitoring user interface by issuing questions to the network through the linear communication orbit. For example, the administrator's device can send the questions to the server of the network and the questions may be packaged in query messages and propagated to the nodes through the server of the network. Each node along the linear communication orbit will be able to quickly respond to these questions based on the past event data stored in their respective local event databases. After the answers have been collected from all relevant nodes in the network, the server of the network forwards the answers back to the administrator's device.

In some embodiments, after a direct duplex connection has been established between a particular node and the remote server, the administrator can also query the local event database of the particular node through the direction duplex connection. In addition, the administrator can take a snapshot of the local event database on the particular node and have it uploaded to the remote server, so that in-depth analysis regarding the particular node may be performed at the remote server (e.g., according to instructions provided by the administrator to the remote server).

In some embodiments, after a direct duplex connection has been established between a particular node and the remote server, the administrator can collect process artifacts from the particular node based on event history and file references for an event of interest identified by the administrator. The administrator can make a copy of the collected process artifacts and corresponding metadata (e.g., OS version, memory, installed apps, usernames, etc.) describing the local environment of the particular node, and use them to create a sandbox (e.g., choose the same operating environment as the particular endpoint machine and add the necessary files and libraries from the collected process artifacts) and recreate the past event(s) in the sandbox for investigation purposes.

In some embodiments, based on the in-depth analysis performed on a particular node, the administrator can select particular events or artifacts of interest in the network monitoring user interface and, in response, be presented with a set of sample questions that can be dispatched to the network for a network-wide analysis. The set of sample questions can be automatically generated based on existing question templates and indicator values that are found on the particular node. The automatic generation of the questions facilitates the investigative process of the administrator, and relieves the administrator from having to create the questions one by one from scratch. In some embodiments, the questions and IOCs for detecting a particular threat or event of interest can be refined (e.g., made more efficient or streamlined) based on the answers collected from the network.

In some embodiments, the server (e.g., remote server 110 or server 108) authenticates a particular node, using the direct duplex connection, before deputizing the node to perform specific tasks on behalf of the server (e.g., enrolling the node as a satellite endpoint).

FIG. 2 illustrates an example of a linear communication orbit 106*d* that includes a server of the network 108 and a plurality of nodes (e.g., endpoint machines 102*z*, 250*d*, 102*y* and 250*b* form linear communication orbit 106*d*). In some embodiments, an administrator identifies (e.g., manually specifies) two endpoint machines, in the linear communication orbit 106*d* (e.g., endpoint 250*b* and endpoint 250*d*), to be enrolled as satellite endpoints 250.

In some embodiments, an administrator selects particular machines to be enrolled as satellite endpoints based on one or more security characteristics of the respective machines (e.g., an endpoint that the administrator knows the machine has greater security as compared to other machines on the network, or that the machine satisfies predefined security criteria). For example, an endpoint that is only accessible to certain trusted users, or is otherwise more secure, is identified as a candidate to be enrolled as a satellite endpoint. In some embodiments, the server (e.g., server 108 or another server) identifies one or more endpoints as candidates to be enrolled as satellite endpoints in accordance with a determination that the one or more endpoints satisfy selection criteria (e.g., criteria relating to a security of the endpoint and optionally processing power criteria as well).

In some embodiments, a direct duplex connection is initiated between the server 108 and each of the identified endpoints that are candidates to be enrolled as satellite endpoints. For example, two direct duplex connections (e.g., established using the process described above with reference to FIG. 1B) are illustrated in FIG. 2, a first direct duplex connection between server 108 and endpoint 250*b*, and a second direct duplex connection between server 108 and endpoint 250*d*.

After establishing the direct duplex connections, the server authenticates the endpoints (e.g., wherein, as explained with reference to FIG. 1B, the endpoints initiate forming the direct duplex connections in response to receiving an instruction packet along the linear communication orbit). For example, to authenticate each endpoint that has established a direct duplex connection, the server system generates a nonce, sends the encrypted nonce (e.g., encrypted using a public key of the endpoint) to the endpoint, and waits for the endpoint to return the nonce (e.g., after decrypting the encrypted nonce using the endpoint's private key) (e.g., to perform a handshake). In another example, the nonce (e.g., pseudo-randomly generated number of value) is communicated to the endpoint, e.g., via a linear communication orbit or using a symmetric encryption channel of the direct duplex connection, and the endpoint then sends the server an encrypted version of the nonce, encrypted with the endpoint's private key; the server then authenticates the endpoint by decrypting the received value and verifying that it matches the nonce. Other authentication protocols, typically using the private and public keys of the endpoint to verify or authenticate the endpoint, are used in a variety of embodiments.

In some embodiments, after an endpoint with a direct duplex connection has been authenticated (e.g., and is trusted as the identified endpoint, and not a spoofed endpoint), the server 108 uses two distinct communication channels to enroll the endpoint as a satellite endpoint. For example, after establishing a direct duplex connection between server 108 and endpoint 250*b*, and authenticating that the direct connection was formed between endpoint 250*b* (e.g., and not a third-party bad actor machine), the server 108 receives a unique identifier, via the direct duplex connection, for identifying endpoint 250*b*. In some embodiments, a second communication channel, distinct from the direct duplex connection, is used to obtain the unique identifier from endpoint 250*b* to confirm that the enrolled endpoint as a satellite is the intended endpoint machine. For example, the second communication channel involves an administrator executing a command on the physical endpoint 250*b* to obtain the unique identifier, and confirms that the unique identifier obtained via the direct duplex connection matches the unique identifier obtained from executing the command on the endpoint. If these unique identifiers match, the endpoint 250*b* is enrolled as a satellite machine.

In some embodiments, after endpoint 250*b* and endpoint 250*d* are enrolled as satellite endpoint machines, they are enabled to perform operations (e.g., using function modules) locally at the satellite endpoint, rather than the operations solely being performed by the server 108. The satellite endpoint machines receive instructions for performing particular tasks, and after performing the tasks, send report messages to the server 108, without requiring the server 108 to execute the functions themselves. As such, satellite endpoint machines are enabled to behave like a server to carry out certain functions on behalf of server 108.

In some embodiments, as described with reference to FIG. 3, a satellite manager module on the server stores the enrollment data for the satellite endpoint machines. For example, the satellite manager module stores information about which machines each satellite has access to (e.g., executes functions on). For example, the satellite manager module stores, for first satellite 250*b*, that first satellite 250*b* has access to two sets of machines: a first set of machines 204A (e.g., on a linear communication orbit distinct from linear communication orbit 106*d*) that are on the same network as the satellites and the server 108. In addition, first satellite 250*b* has access to a second set of machines 204B that are outside of the network (e.g., across firewall 104).

Accordingly, in some embodiments, a satellite endpoint machine is used to perform functions that require investigation outside of the network. For example, discovery of additional endpoint machines that are outside of linear communication orbit 106*a* (e.g., and outside of the network that includes linear communication orbit 106*a*), such as the second set of machines 204B, is performed by satellite endpoint 250*b*. Because satellite endpoint 250*b* is communicating with and accessible to other machines on the network (e.g., on linear communication orbit 106*d*), it is important that the server 108 establishes a trusted connection with the satellite endpoint 250*b* (e.g., to confirm that the endpoint 250*b* enrolled as a satellite is not a bad actor or third-party "man-in-the-middle" machine), such as the direct duplex connection.

Second satellite 250*d* has access to a third set of machines 204C, distinct from the sets of machines that first satellite 250*b* accesses. Thus, the server is enabled to deputize a plurality of satellite machines to execute functions (e.g., perform discovery and/or scan operations) on distinct sets of machines on behalf of the server 108.

Figure 3:
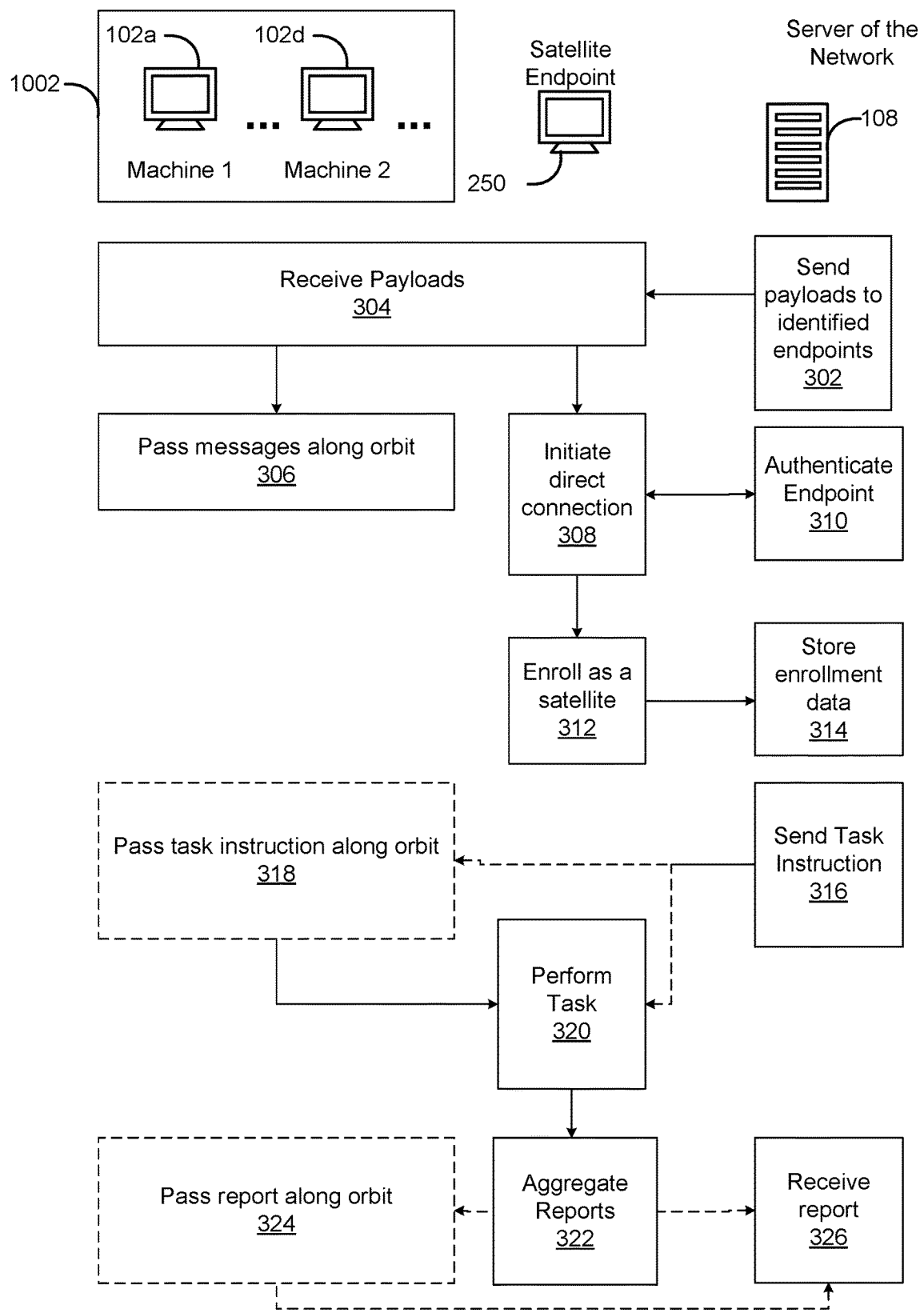
FIG. 3 is a flow chart of a method for establishing a satellite endpoint and instructing the satellite endpoint to perform tasks, in accordance with some embodiments.

FIG. 3 illustrates a flow diagram for enrolling satellite endpoints in a linear communication orbit. In some embodiments, the server of the network 108 (e.g., or a combination of servers in the server system of the network), identifies one or more endpoints as candidates to be enrolled as satellite machines. For example, as described above, an administrator selects one or more endpoint machines (e.g., that satisfy selection criteria, such as security criteria) as candidates for enrollment as satellite endpoints. The server 108 (e.g., a first server of the network) receives the identification of the one or more endpoint machines, and sends (e.g., distributes) 302 one or more payloads, using the linear communication orbit, that include indications of the endpoint machines identified as candidate satellite endpoints. The machines of the linear communication orbit receive 304 the one or more payloads, and machines that are not identified (e.g., in the set of machines 1002) pass the payload messages along the orbit 306 (e.g., without taking further action), while a machine that is identified by the payload, in response to receiving the payload, initiates a direct connection 308 with server 108 (e.g., the same server, or another server of the network).

In some embodiments, the endpoint 250 initiates a direct connection (e.g., also referred to herein as a direct duplex connection), and in response to establishing the direct connection with the server 108, the server 108 authenticates the endpoint 250. For example, as described above, the server generates a nonce and encrypts the nonce with a public key of the endpoint 250, and waits for the endpoint 250 to descript and return the nonce as a means of authentication. For example, while establishing the direct connection (e.g., or in response to establishing the direct connection) with an endpoint, the server 108 authenticates (e.g., verifies) that the endpoint is legitimate (e.g., trusted, not a man-in-the-middle attacker). In some embodiments, if the endpoint fails to be authenticated (e.g., while (or in response to) establishing the direct duplex connection), the server does not attempt to enroll the endpoint as a satellite machine. It will be understood that the direct duplex connection is not necessarily a (e.g., physically) "direct" connection between the server and the endpoint. For example, the direct duplex connection may be proxied through one or more additional machines. However, the direct duplex connection is generally a point-to-point encrypted communication channel, and only the server on one end and the endpoint on the other end are able to use the direction duplex connection to convey and receive information.

In some embodiments, after the endpoint 250 has established a direct duplex connection and has been authenticated, the endpoint 250 is enrolled as a satellite endpoint 312, and enrollment data for the endpoint 250 is stored 314 at the server 108 (e.g., the first server of the network, or another server that includes a satellite manager module). In some embodiments, enrolling the endpoint 250 as a satellite comprises validating the endpoint over two distinct channels. For example, the endpoint 250 sends a unique identifier to the server 108 (e.g., via the direct duplex connection), and an administrator manually runs a command (e.g., in the command line) at the endpoint 250 to separately retrieve a unique identifier. In some embodiments, the administrator (e.g., or the server 108) confirms that the unique identifiers obtained via the two distinct channels match. In some embodiments, in accordance with a determination that the unique identifiers match, the endpoint 250 is enrolled as a satellite machine.

In some embodiments, after (or, alternatively, before) the endpoint 250 is enrolled as a satellite endpoint machine, the endpoint 250 is loaded with one or more function modules to enable the endpoint 250 to perform tasks, using the function modules, that a typical endpoint (e.g., machines 1002) is not able to perform. For example, the server 108 (e.g., a satellite manager of the server) deputizes the enrolled satellite endpoint to execute one or more function modules that typically the server 108 would execute itself.

In some embodiments, function modules are loaded to the endpoint 250 in the same way that other software modules and updates are conveyed to endpoint machines: by conveying, e.g., via a linear communication orbit, an initial message to the endpoint 250, typically with a manifest listing all the software components that need to be obtained and installed by the endpoint 250. After receiving the manifest, the endpoint 250 automatically sends requests for all the software components listed in the manifest, and upon receiving those software components, combines the software components to generate one or more function modules and installs the function modules at the endpoint 250.

In some embodiments, each function module (e.g., which is provided to or otherwise installed on the satellite endpoint) is configured to collect data related to a core function of that function module from a plurality of machines (e.g., a plurality of machines distributed on linear communication orbit 106*a*, a plurality of machines distributed on another linear communication orbit (e.g., within the network), and/or a plurality of machines that are outside of the network). Examples of function modules include, but are not limited to, a software deployment module configured to deploy a software package to machines, a patch module configured to install software patches on machines, and a security management module configured to distribute security rules and procedures to machines. In some embodiments, a central data management module is installed on server system 108 to manage data to be collected by the plurality of function modules (e.g., running on one or more satellite endpoints). To facilitate centralized data management, each function module (e.g., a respective satellite endpoint) includes (e.g., is installed with) an internal client that is controlled by the central data management module to collect and pre-process data related to the core function of respective function module.

In some embodiments, the enrollment data for each satellite endpoint is stored in a satellite manager module at server 108 (e.g., or another server of the network). In some embodiments, the satellite manager module tracks, for each satellite endpoint, the set of function modules that the satellite is enabled to execute, and the set of machines on which the satellite endpoint reports. For example, each satellite endpoint 250 executes a task (e.g., using the function module) for a specified set of machines (e.g., a plurality of machines distributed on linear communication orbit 106a, a plurality of machines distributed on another linear communication orbit (e.g., within the network) (e.g., set of machines 204A or 204C), and/or a plurality of machines that are outside of the network (e.g., set of machines 204B)). Accordingly, the satellite manager module knows which satellite endpoint to send the instructions in order to execute different tasks on different sets of machines.

In some embodiments, after the endpoint 250 is enrolled as a satellite machine, the server 108 (e.g., the first server of the network, or another server that includes or has access to a satellite manager module) sends a task instruction 316 to be carried out by the endpoint 250. In some embodiments, the task instruction is a task to be executed using the one or more function modules that were loaded on (e.g., enabled to be executed by) the enrolled satellite machine. In some embodiments, the task instruction is sent to the endpoint 250 via the linear communication orbit (e.g., passed along the orbit 318 using machines 1002). In some embodiments, the task instruction is sent via the direct duplex connection established with the endpoint 250.

After the satellite endpoint 250 has received the task instruction, the satellite endpoint 250 performs the task 320 (e.g., using the function modules, as described with reference to FIG. 2B). In some embodiments, performance of the task includes scanning one or more machines that are outside of the network (e.g., set of machines 204B, FIG. 2). In some embodiments, different satellite endpoints are assigned different task instructions (e.g., a first satellite endpoints is instructed to perform a first set of tasks and a second satellite endpoint is instructed to perform a second set of tasks). In some embodiments, a plurality of satellite endpoints are instructed to perform overlapping tasks (e.g., two or more satellite endpoints perform a same task (e.g., on the same or a different set of machines)). In some embodiments, each satellite endpoint performs tasks on a different set of machines. For example, respective satellite endpoints are assigned to respective subsets of machines (e.g., within and/or outside of the network), such that each satellite endpoint need not perform a scan on all of the machines.

In some embodiments, the satellite endpoint 250 aggregates reports generated by performing the task (e.g., using the function module(s)), and sends the reports back to the server of the network 108 (e.g., the same server, or another server than the server that sent the task instruction and/or that enrolled the satellite endpoint). In some embodiments, the report is sent via the linear communication orbit 324 to server. In some embodiments, the report is sent via the direct duplex connection to the server of the network 108. The server of the network receives the report 326.

Figure 4B:
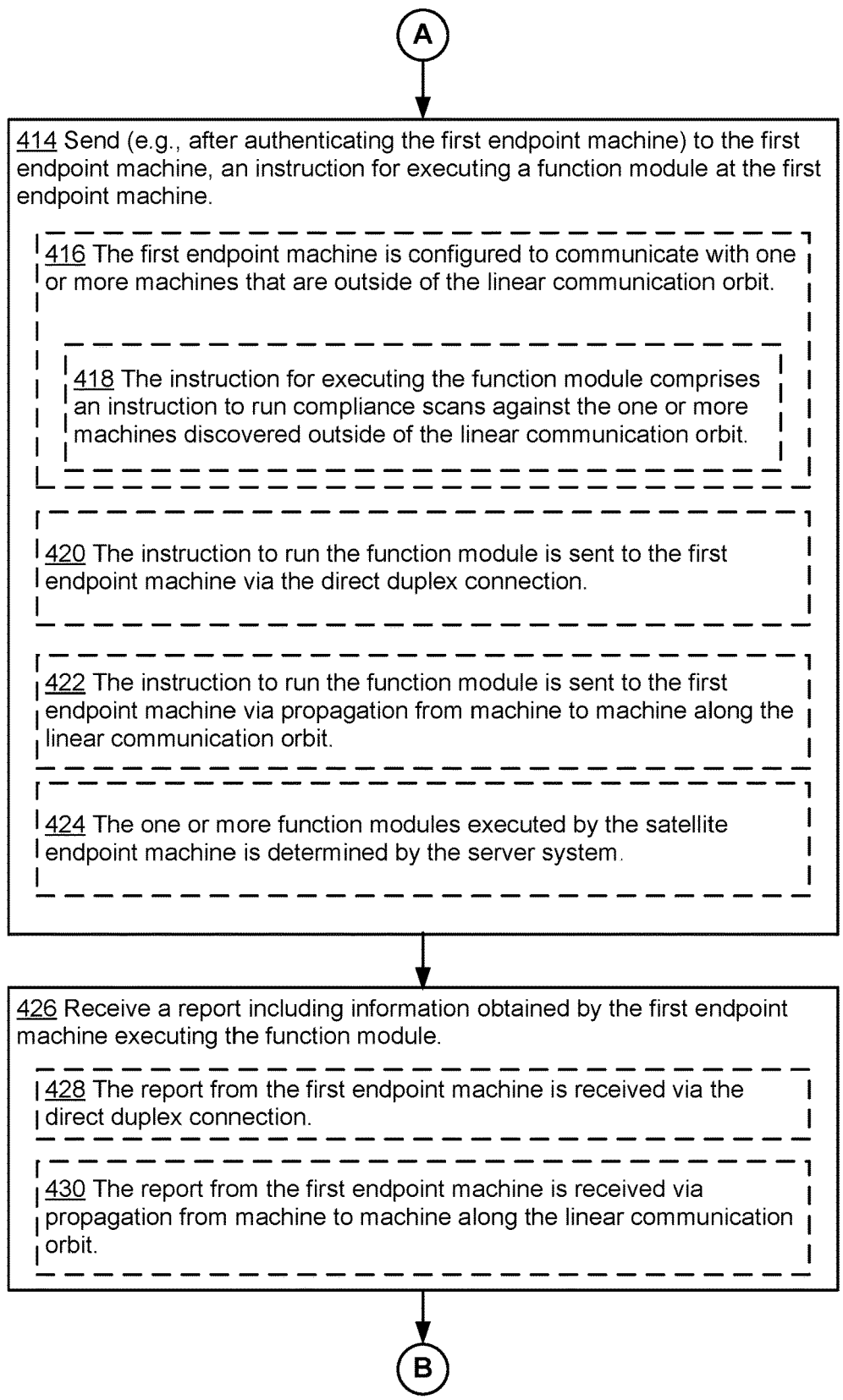

FIGS. 4A-4C illustrate a flow chart of a method 400 for distributed data processing by enrolling satellite endpoint machines, in accordance with some embodiments. For brevity, method 400 is described as being performed by a server system (e.g., server 108, FIGS. 1A-1B), which in some embodiments is one or more servers in the network that includes a linear communication orbit (e.g., linear communication orbit 106a).

To that end, method 400 includes, identifying (402) a first endpoint machine, of the plurality of machines, in the linear communication orbit (e.g., a plurality of endpoints in linear communication orbit 106a). For example, as described above, an administrator selects one or more endpoints that meet selection criteria (e.g., based on a security of the endpoint). Alternatively, the selection or identification of the first endpoint machine may be made by a third party (e.g., a server, or administrator working on a different computer than the computer performing method 400). In some embodiments, identifying the first endpoint machine includes sending a one or more (e.g., a plurality of) special payloads to a plurality of machines in the linear communication orbit to instruct the first endpoint machine to initiate the direct connection (e.g., as described with reference to step 302 in FIG. 3).

The method includes establishing (404) a direct duplex connection between the server system and the first endpoint machine. For example, as described with reference to FIGS. 1B and 2, a direct duplex connection is initiated by the first endpoint machine.

In some embodiments, establishing the direct duplex connection comprises (406) sending an instruction packet via the linear communication orbit, wherein the instruction packet has been propagated to the first endpoint machine through one or more upstream machines along the linear communication orbit, and wherein the instruction packet includes an instruction for establishing the direct duplex connection between the first endpoint machine and the server system (e.g., one or more servers).

In some embodiments, the direct duplex connection (e.g., which, in some embodiments, is proxied through other intermediate devices) is (408) an encrypted channel (e.g., a point-to-point connection) such that credentials are not shared over a communication network that includes the linear communication orbit. For example, this point-to-point connection allows the server to verify that the endpoint is the endpoint that the server (e.g., and network) trusts.

The method includes enrolling (410) (e.g., using a satellite manager of the server 108) the first endpoint machine as a satellite endpoint machine, wherein enrollment of the satellite endpoint machine (e.g., the first endpoint machine) enabled the satellite endpoint machine to execute one or more function modules. For example, as described above, an endpoint machine that is enrolled as a satellite is enabled to execute function modules (e.g., as determined by the server system) that an non-satellite endpoint machine (e.g., an endpoint machine not enrolled as a satellite endpoint machine) is not enabled (e.g., trusted) to execute. As such, the server system selectively allows satellite endpoint machines to execute one or more function modules, without allowing non-satellite endpoint machines (e.g., in the linear communication orbit) to execute the one or more function modules. In some embodiments, the method further includes, storing, using the satellite manager, information for the enrolled first endpoint machine.

In some embodiments, enrolling the first endpoint machine includes (412) matching a unique identifier, provided by the first endpoint machine via the direct duplex connection, to a unique identifier retrieved via another channel. For example, as described above, the other channel comprises an administrator manually going to the first endpoint machine, and running a command to retrieve the unique identifier that is compared with the unique identifier obtained from the direct duplex connection.

The method typically includes authenticating (413), via the direct duplex connection, the first endpoint machine. For example, as described with reference to step 310 in FIG. 3, the server authenticates the endpoint machine (e.g., using the direct duplex connection). In some embodiments, the server authenticates the endpoint machine before initiating the enrollment process to enroll the endpoint machine as a satellite (e.g., to verify that the endpoint is trustworthy before setting up the endpoint to run function modules on behalf of the server or a server system).

The method further includes, sending (414) (e.g., after authenticating the first endpoint machine) to the first endpoint machine (e.g., the satellite endpoint machine), an instruction for executing a function module at the first endpoint machine. For example, the first endpoint machine executes the function module as a satellite of (e.g., on behalf of) the server system. In some embodiments, the function module is a function module that the first endpoint machine is authorized to execute (e.g., in accordance with the first endpoint machine being enrolled as a satellite endpoint machine), as described above with reference to FIG. 3.

As explained with reference to FIGS. 1A and 2, a network or distributed system of machines 100 may optionally include more than one linear communication orbit (e.g., a plurality of linear communication orbits), each respective linear communication orbit having a set of machines located at successive nodes of the respective linear communication orbit. Thus, in some implementations, the linear communicator orbit discussed with respect to method 400 is a respective (e.g., first) linear communication orbit of a plurality of communication orbits in a managed network of machines. Furthermore, method 400 may include selecting and enrolling endpoint machines in two or more linear communication orbits as satellite endpoint machines, as well as executing function modules in satellite endpoint machines that are located in two or more linear communication orbits, thereby further enabling functions typically associated with a server system to be delegated out to satellite endpoint machines.

In some embodiments, the first endpoint machine (e.g., the satellite endpoint machine) is configured to (416) communicate with (e.g., scan) one or more machines that are outside of the linear communication orbit (e.g., outside of the network). In some embodiments, the instruction to execute a function module is an instruction to discover (e.g., scan for) unmanaged assets that are outside of the linear communication orbit (e.g., or outside of the network).

In some embodiments, the instruction for executing the function module comprises (418) an instruction to run compliance scans against the one or more machines discovered outside of the linear communication orbit. For example, the first endpoint machine (e.g., the satellite endpoint machine), while executing the function module, scans for live unmanaged machines within a first selected portion of the network that corresponds to a first range of machine identifiers that is between the respective machine identifiers of a respective upstream neighbor of the first managed machine and a respective downstream neighbor of the first managed machine in the linear communication orbit.

In some embodiments, the instruction to execute the function module is sent (420) to the first endpoint machine (e.g., the satellite endpoint machine) via the direct duplex connection.

In some embodiments, the instruction to run the function module is sent (422) to the first endpoint machine (e.g., the satellite endpoint machine) via propagation from machine to machine (e.g., node to node) along the linear communication orbit.

In some embodiments, the one or more function modules executed by the first endpoint machine (e.g., the satellite endpoint machine) is determined (424) by the server system (e.g., the server selects the functions that the satellite endpoint is trusted to perform). For example, as described above with reference to FIG. 3, the satellite manager module at the server determines which functions are to be performed by respective satellite endpoint machines.

The method includes receiving (426) a report including information obtained by the first endpoint machine (e.g., the satellite endpoint machine) executing the function module.

In some embodiments, the report from the first endpoint machine (e.g., the satellite endpoint machine) is received (428) via the direct duplex connection.

In some embodiments, the report from the first endpoint machine (e.g., the satellite endpoint machine) is received (430) via propagation from machine to machine (e.g., node to node) along the linear communication orbit.

At least one of the establishing a direct duplex connection, sending the instruction, and receiving the report includes (432) sending or receiving a communication between the first endpoint machine (e.g., the satellite endpoint machine) and the server system via the linear communication orbit.

In some embodiments, the method further includes identifying (434) a second endpoint machine as a satellite endpoint machine (e.g., second satellite 250d, FIG. 2). In some embodiments, the method includes identifying a plurality of endpoints in the linear communication orbit that are candidates to be enrolled as satellites, such that each satellite can be instructed to perform different (e.g., or the same, or a partially overlapping set of) tasks. In some embodiments, each of a plurality of endpoint machines identified as satellite endpoint machines is assigned a distinct subset of endpoint machines in a network from which to collect information and/or to which module services (e.g., risk management or amelioration services) are to be provided.

FIG. 5 is a block diagram of an exemplary machine 500 (e.g., serving as a node 102 shown in FIGS. 1A-1B). In some implementations, machine 500 includes one or more processors 502, memory 504 for storing programs and instructions for execution by one or more processors 502, one or more communications interfaces such as input/output interface 506 and network interface 508, and one or more communications buses 510 for interconnecting these components.

In some embodiments, input/output interface 506 includes a display and input devices such as a keyboard, a mouse or a track-pad. In some embodiments, communication buses 510 include circuitry (sometimes called a chipset) that interconnects and controls communications between system components. In some embodiments, memory 504 includes high-speed random access memory, such as DRAM, SRAM, DDR RAM or other random access solid state memory devices; and optionally includes non-volatile memory, such as one or more magnetic disk storage devices, optical disk storage devices, flash memory devices, or other non-volatile solid state storage devices. In some embodiments, memory 504 includes one or more storage devices remotely located from the one or more processors 502. In some embodiments, memory 504, or alternatively the non-volatile memory device(s) within memory 504, comprises a non-transitory computer readable storage medium.

In some embodiments, memory 504 or alternatively the non-transitory computer readable storage medium of memory 504 stores the following programs, modules and data structures, instructions, or a subset thereof:

- Operating System 512 that includes procedures for handling various basic system services and for performing hardware dependent tasks.
- I/O module 514 that includes procedures for handling various basic input and output functions through one or more input and output devices.
- Communication module 516 that is used for connecting machine 500 to other machines (e.g., other machines 102 in network 100), administrator's device 116, or servers (e.g., server 108/110) via one or more network communication interfaces 508 (wired or wireless) and one or more communication networks, such as the Internet, other wide area networks, local area networks, metropolitan area networks, and so on.
- Orbit formation and maintenance module 518 that includes instructions to self-insert into a linear communication orbit and self-healing from a broken link in the linear communication orbit.
- Message and command module 520 that includes instructions for (1) providing and collecting system, security and network management messages and commands (e.g., detection requests, reporting requests, reporting messages, remedial instructions, etc.) and/or (2) distribution of files and software updates (e.g., the management software).
- Other modules 522 that include instructions for handling other functions and aspects described herein, such as creation and maintenance of local event logs and performing IOC evaluations based on local state.
- Local Database 524 that stores local values for event histories, e.g., results for one or more indicator items (e.g., results of evaluating one or more indicator items with respect to a file or set of files, such as files 526), event artifacts, and/or an index of indicator item evaluation results, etc.
- Files 526, optionally including files having executable programs, image files containing images, and/or data files containing data of various types.
- Satellite Function Module(s) 528 that include function modules specifically assigned to the machine 500, by the server system, in accordance with the machine being enrolled as a satellite endpoint machine.

FIG. 5 is merely illustrative of the structures of machines 500. A person skilled in the art would recognize that particular embodiments of machines 500 may include more or fewer components than those shown. One or more modules may be divided into sub-modules, and/or one or more functions may be provided by different modules than those shown.

FIG. 6 is a block diagram of an exemplary machine 600 (e.g., serving as a server 108 of the network shown in FIGS. 1A-1B). In some implementations, machine 600 includes one or more processors 602, memory 604 for storing programs and instructions for execution by one or more processors 602, one or more communications interfaces such as input/output interface 606 and network interface 608, and one or more communications buses 610 for interconnecting these components.

In some embodiments, input/output interface 606 includes a display and input devices such as a keyboard, a mouse or a track-pad. In some embodiments, communication buses 610 include circuitry (sometimes called a chipset) that interconnects and controls communications between system components. In some embodiments, memory 604 includes high-speed random access memory, such as DRAM, SRAM, DDR RAM or other random access solid state memory devices; and optionally includes non-volatile memory, such as one or more magnetic disk storage devices, optical disk storage devices, flash memory devices, or other non-volatile solid state storage devices. In some embodiments, memory 604 includes one or more storage devices remotely located from the one or more processors 602. In some embodiments, memory 604, or alternatively the non-volatile memory device(s) within memory 604, comprises a non-transitory computer readable storage medium.

In some embodiments, memory 604 or alternatively the non-transitory computer readable storage medium of memory 604 stores the following programs, modules and data structures, instructions, or a subset thereof:

- Operating System 612 that includes procedures for handling various basic system services and for performing hardware dependent tasks.
- I/O module 614 that includes procedures for handling various basic input and output functions through one or more input and output devices.
- Communication module 616 that is used for connecting machine 600 to other machines (e.g., machines 102 in network 100, an administrator's device 116) or servers (e.g., remote server 110) via one or more network communication interfaces 608 (wired or wireless) and one or more communication networks, such as the Internet, other wide area networks, local area networks, metropolitan area networks, and so on.
- Orbit formation module 618 that includes instructions to determine and provide ordinal positions of machines 102 in an ordered sequence of all managed machines 102 currently known to be coupled to network 100.
- Message and command module 620 that includes instructions for (1) providing and collecting system, security and network management messages and commands (e.g., detection requests, reporting requests, reporting messages, remedial instructions, etc.) and/or (2) distribution of files and software updates (e.g., the management software). In some embodiments, message and command module 720 provides a user interface for a network or system administrator to directly perform various system and network functions, such as issuing status inquiries, providing management instructions, deploying system configurations, and dispatching software updates, etc.
- Other modules 622 that include instructions for handling other functions and aspects described herein, such as forwarding instructions, queries, requests from the administrator's device and/or the remote investigating server along the linear communication orbit, and forwarding responses and answers collected from the network to the administrator's device and/or the remote investigating server. In some embodiments, other modules 622 include modules corresponding to the function modules executed by one or more satellite endpoint machines, for aggregating and organizing the information received from the corresponding function modules executed by the one or more satellite endpoint machines.

Collected data 624 that optionally include raw and/or processed data collected from the network, including for example, local values for event histories, event artifacts, and/or an index of indicator item evaluation results, etc. collected from the network.

Files 626, optionally including files having executable programs, image files containing images, and/or data files containing data of various types.

Satellite Management Module 628 for enrolling satellite endpoint machines, storing enrollment data, sending task instructions and/or receiving reports from satellite endpoint machines.

FIG. 6 is merely illustrative of the structures of machines 600. A person skilled in the art would recognize that particular embodiments of machines 600 may include more or fewer components than those shown. One or more modules may be divided into sub-modules, and/or one or more functions may be provided by different modules than those shown.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

It will be understood that, although the terms "first," "second," etc. may be used herein to describe various elements, these elements should not be limited by these terms. These terms are only used to distinguish one element from another. For example, a first widget could be termed a second widget, and, similarly, a second widget could be termed a first widget, without changing the meaning of the description, so long as all occurrences of the "first widget" are renamed consistently and all occurrences of the "second widget" are renamed consistently. The first widget and the second widget are both widgets, but they are not the same widget.

The terminology used herein is for the purpose of describing particular implementations only and is not intended to be limiting of the claims. As used in the description of the implementations and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "upon a determination that" or "in response to determining" or "in accordance with a determination" or "upon detecting" or "in response to detecting" that the stated condition precedent is true, depending on the context.

What is claimed is:

1. A method of distributed data processing, the method comprising:
   at a server system in communication with a plurality of machines that form a linear communication orbit comprising a network topology in which a message is passed from machine to machine in a predetermined sequence in the linear communication orbit:
      establishing a direct duplex connection between the server system and a first endpoint machine;
      enrolling the first endpoint machine as a satellite endpoint machine, wherein the enrolling enables the satellite endpoint machine to execute one or more function modules;
      sending to the enrolled-first endpoint machine an instruction for executing a function module at the first endpoint machine, the function model to cause the first endpoint machine to collect information from one or more machines outside of the linear communication orbit; and
      receiving a report generated by the first endpoint machine based on the information collected by the first endpoint machine executing the function module,
      wherein at least one of the establishing a direct duplex connection, sending the instruction, and receiving the report includes sending or receiving a communication between the first endpoint machine and the server system via the linear communication orbit.

2. The method of claim 1, further comprising authenticating the first endpoint machine via the direct duplex connection, wherein the first endpoint machine is authenticated prior to sending the instruction for executing the function module.

3. The method of claim 1, wherein the first endpoint machine is configured to scan for and identify the one or more machines outside of the linear communication orbit.

4. The method of claim 3, wherein the instruction for executing the function module comprises an instruction to run compliance scans against the one or more machines outside of the linear communication orbit.

5. The method of claim 1, wherein the instruction comprises a first instruction and wherein establishing the direct duplex connection comprises sending a second instruction to the first endpoint machine via the linear communication orbit, wherein:
   the second instruction is propagated to the first endpoint machine through one or more upstream machines along the linear communication orbit, and
   the second instruction is to cause the first endpoint machine to initiate the direct duplex connection between the first endpoint machine and the server system.

6. The method of claim 1, wherein enrolling the first endpoint machine includes matching a unique identifier, provided by the first endpoint machine via the direct duplex connection, to a unique identifier retrieved via another channel.

7. The method of claim 1, further comprising:
   identifying a second endpoint machine as a satellite endpoint machine, wherein each of a plurality of endpoint machines identified as satellite endpoint machines is assigned a distinct subset of endpoint machines in a network from which to collect information and/or to which module services are to be provided.

8. A server system, comprising:
one or more computers, comprising servers, in communication with a plurality of machines that forms a linear communication orbit comprising a network topology in which a message is passed from machine to machine in a predetermined sequence in the linear communication orbit, wherein the one or more computers include one or more processors and memory storing one or more programs, the one or more programs including instructions for causing the server system to perform operations comprising:
   establishing a direct duplex connection between the server system and a first endpoint machine;
   enrolling the first endpoint machine as a satellite endpoint machine, wherein the enrolling enables the satellite endpoint machine to execute one or more function modules;
   sending to the first endpoint machine an instruction for executing a function module at the first endpoint machine, the function model to cause the first endpoint machine to collect information from one or more machines outside of the linear communication orbit; and
   receiving a report generated by the first endpoint machine based on the information collected by the first endpoint machine executing the function module,
   wherein at least one of the establishing a direct duplex connection, sending the instruction, and receiving the report includes sending or receiving a communication between the first endpoint machine and the server system via the linear communication orbit.

9. The server system of claim 8, wherein the one or more programs include instructions for authenticating the first endpoint machine via the direct duplex connection, wherein the first endpoint machine is authenticated prior to sending the instruction for executing the function module.

10. The server system of claim 8, wherein the first endpoint machine is configured to scan for and identify the one or more machines outside of the linear communication orbit.

11. The server system of claim 10, wherein the instruction for executing the function module comprises an instruction to run compliance scans against the one or more machines outside of the linear communication orbit.

12. The server system of claim 8, wherein the instruction comprises a first instruction and wherein establishing the direct duplex connection comprises sending a second instruction to the first endpoint machine via the linear communication orbit, wherein:
   the second instruction is propagated to the first endpoint machine through one or more upstream machines along the linear communication orbit, and
   the second instruction is to cause the first endpoint machine to initiate the direct duplex connection between the first endpoint machine and the server system.

13. The server system of claim 8, wherein enrolling the first endpoint machine includes matching a unique identifier, provided by the first endpoint machine via the direct duplex connection, to a unique identifier retrieved via another channel.

14. The server system of claim 8, wherein the one or more programs include instructions for identifying a second endpoint machine as a satellite endpoint machine, wherein each of a plurality of endpoint machines identified as satellite endpoint machines is assigned a distinct subset of endpoint machines in a network from which to collect information and/or to which module services are to be provided.

15. A first machine in a collection of machines that forms a linear communication orbit comprising a network topology in which a message is passed from machine to machine in a predetermined sequence in the linear communication orbit, the first machine comprising:
   one or more processors; and
   memory storing instructions that, when executed by the one or more processors, cause the processors to perform operations including:
      establishing a direct duplex connection between the first machine and the server system;
      enrolling the first machine as a satellite endpoint machine with the server system, wherein the enrolling enables the first machine, as an satellite endpoint machine, to execute one or more function modules;
      receiving, from the server system, an instruction for executing a function module at the first machine the function model to cause the first machine to collect information from one or more machines outside of the linear communication orbit; and
      in response to the instruction:
         executing the function module; and
         generating a report including information obtained by executing the function module; and
         sending the report to the server system,
      wherein at least one of the establishing the direct duplex connection, receiving the instruction, and sending the report includes sending or receiving a communication between the first machine and the server system via a linear communication orbit.

16. The first machine of claim 15, further comprising participating, via the direct duplex connection, in authentication of the first machine, wherein the first machine is authenticated prior to receiving the instruction for executing a function module.

17. The first machine of claim 15, further comprising, scanning for and identifying the one or more machines that are outside of the linear communication orbit.

18. The first machine of claim 17, wherein executing the function module comprises running compliance scans against the one or more machines outside of the linear communication orbit.

19. The first machine of claim 15, wherein the instruction comprises a first instruction and wherein establishing the direct duplex connection comprises receiving a second instruction, from the server system, via the linear communication orbit, wherein:
   the second instruction is propagated to the first machine through one or more upstream machines along the linear communication orbit, and
   the second instruction is to cause the first machine to initiate the direct duplex connection between the first machine and the server system.

20. The first machine of claim 15, wherein enrolling the first machine as a satellite endpoint machine with the server system includes, by the server system, matching a unique identifier, provided by the first machine via the direct duplex connection, to a unique identifier retrieved via another channel.

21. The first machine of claim 15, wherein:
the first machine is in communication with a second machine that is enrolled as a satellite endpoint machine, wherein each of a plurality of machines identified as satellite endpoint machines is assigned a distinct subset of endpoint machines in a network from which to collect information and/or to which module services are to be provided.

22. A non-transitory computer-readable storage medium storing instructions that, when executed by one or more processors on a server system in communication with a plurality of machines that forms a linear communication orbit comprising a network topology in which a message is passed from machine to machine in a predetermined sequence in the linear communication orbit, cause the server system to perform operations comprising:
establishing a direct duplex connection between the server system and a first endpoint machine;
enrolling the first endpoint machine as a satellite endpoint machine, wherein the enrolling enables the satellite endpoint machine to execute one or more function modules;
sending to the first endpoint machine an instruction for executing a function module at the first endpoint machine, the function model to cause the first endpoint machine to collect information from one or more machines outside of the linear communication orbit; and
receiving a report generated by the first endpoint machine based on the information collected by the first endpoint machine executing the function module,
wherein at least one of the establishing a direct duplex connection, sending the instruction, and receiving the report includes sending or receiving a communication between the first endpoint machine and the server system via the linear communication orbit.

23. The non-transitory computer-readable storage medium of claim 22, wherein the one or more programs include instructions for authenticating the first endpoint machine via the direct duplex connection, wherein the first endpoint machine is authenticated prior to sending the instruction for executing the function module.

24. The non-transitory computer-readable storage medium of claim 22, wherein the first endpoint machine is configured to scan for and identify the one or more machines outside of the linear communication orbit.

25. The non-transitory computer-readable storage medium of claim 24, wherein the instruction for executing the function module comprises an instruction to run compliance scans against the one or more machines outside of the linear communication orbit.

26. The non-transitory computer-readable storage medium of claim 22, wherein the instruction comprises a first instruction and wherein establishing the direct duplex connection comprises sending a second instruction via the linear communication orbit, wherein:
the second instruction is propagated to the first endpoint machine through one or more upstream machines along the linear communication orbit, and
the second instruction is to cause the first endpoint machine to initiate the direct duplex connection between the first endpoint machine and the server system.

27. The non-transitory computer-readable storage medium of claim 22, wherein enrolling the first endpoint machine includes matching a unique identifier, provided by the first endpoint machine via the direct duplex connection, to a unique identifier retrieved via another channel.

28. The non-transitory computer-readable storage medium of claim 22, wherein the one or more programs include instructions for identifying a second endpoint machine as a satellite endpoint machine, wherein each of a plurality of endpoint machines identified as satellite endpoint machines is assigned a distinct subset of endpoint machines in a network from which to collect information and/or to which module services are to be provided.

* * * * *